US012645890B2

(12) United States Patent
Sodhi et al.

(10) Patent No.: US 12,645,890 B2
(45) Date of Patent: Jun. 2, 2026

(54) AUTOMATION OF TASKS USING LANGUAGE MODEL PROMPTS

(71) Applicant: ASAPP, INC., New York, NE (US)

(72) Inventors: Paloma Sodhi, Ithaca, NY (US); Ryan Thomas McDonald, London (GB); Satchuthananthavale Rasiah Kuhan Branavan, London (GB); Volkan Cirik, London (GB)

(73) Assignee: ASAPP, INC., New York, NY (US)

( * ) Notice: Subject to any disclaimer, the term of this patent is extended or adjusted under 35 U.S.C. 154(b) by 200 days.

(21) Appl. No.: 18/342,350

(22) Filed: Jun. 27, 2023

(65) Prior Publication Data

US 2024/0386216 A1 Nov. 21, 2024

Related U.S. Application Data

(60) Provisional application No. 63/468,722, filed on May 24, 2023, provisional application No. 63/467,211, filed on May 17, 2023.

(51) Int. Cl.
*G06F 40/30* (2020.01)
*G06F 40/35* (2020.01)
(Continued)

(52) U.S. Cl.
CPC .............. *G06F 40/40* (2020.01); *G06F 40/30* (2020.01); *G06F 40/35* (2020.01); *G06F 40/56* (2020.01)

(58) Field of Classification Search
CPC ....... G10L 15/00; G10L 15/16; G10L 15/183; G10L 15/22; G10L 15/30; G06F 40/30;
(Continued)

(56) References Cited

U.S. PATENT DOCUMENTS 8,793,261 B2 * 7/2014 Jiang ................... G06F 16/3344
707/750
12,142,027 B1 * 11/2024 Saraee ................... G06N 3/045
(Continued)

OTHER PUBLICATIONS

MiniWoB++, https://miniwob.farama.org (accessed on Sep. 25, 2024), 2 pages.
(Continued)

*Primary Examiner* — Vijay B Chawan
(74) *Attorney, Agent, or Firm* — GTC Law Group PC & Affiliates

(57) ABSTRACT

A task, such as task completed using a website, may be automated by submitting prompts to a language model and requesting that that language model provide one or more next actions to be performed to complete the task. The accuracy of the language model in providing correct actions may be improved by using one or few-shot learning where examples of completing a task are provided in a prompt to the language model. The accuracy of the language model may also be improved by breaking a task into subtasks. A prompt may be submitted to the language model to request that the language model indicate a subtask to be performed to complete the task. A prompt may then be submitted to the language model to request that the language model indicate a next action to be performed to complete the subtask.

20 Claims, 18 Drawing Sheets

(51) Int. Cl.
*G06F 40/40* (2020.01)
*G06F 40/56* (2020.01)
(58) Field of Classification Search
CPC ...... G06F 40/35; G06F 40/205; G06F 40/284;
G06F 40/56; G06F 40/211; G06F 40/216;
G06F 40/226; G06F 40/242; G06F
16/383; G06N 3/045; G06N 3/384; G06N
20/00; G06N 3/0475
USPC ........................................................... 704/9
See application file for complete search history.

(56) References Cited

U.S. PATENT DOCUMENTS

| 2024/0046318 A1* | 2/2024 | Muriqi | G06Q 20/389 |
|---|---|---|---|
| 2024/0249077 A1* | 7/2024 | Chen | G06N 3/0455 |
| 2024/0281663 A1* | 8/2024 | Chen | G06N 3/0895 |
| 2024/0311546 A1* | 9/2024 | Maschmeyer | G06F 40/166 |
| 2024/0370658 A1* | 11/2024 | Zhang | G06F 40/242 |
| 2024/0386216 A1* | 11/2024 | Sodhi | G06F 40/40 |
| 2024/0428013 A1* | 12/2024 | Wen | G06F 40/56 |
| 2025/0005288 A1* | 1/2025 | Amatriain-Rubio | G06F 40/216 |
| 2025/0013873 A1* | 1/2025 | Divakaran | G06N 3/098 |
| 2025/0053754 A1* | 2/2025 | Heller | G06F 40/56 |
| 2025/0078822 A1* | 3/2025 | Perkins | H04M 3/5166 |
| 2025/0094865 A1* | 3/2025 | Wang | G06F 40/35 |
| 2025/0111167 A1* | 4/2025 | Mcintyre | G06F 16/383 |
| 2025/0124060 A1* | 4/2025 | Hackman | G06F 16/3329 |
| 2025/0124234 A1* | 4/2025 | Enes | G06F 40/40 |
| 2025/0124308 A1* | 4/2025 | Ramani | G06N 5/022 |
| 2025/0139367 A1* | 5/2025 | Manandise | G06F 40/284 |

OTHER PUBLICATIONS

Adept: AI that powers the workforce, https://www.adept.ai (accessed on Sep. 25, 2024), 8 pages.
"Significant-Gravitas/AutoGPT", https://github.com/Significant-Gravitas/AutoGPT (accessed on Sep. 25, 2024), 7 pages.
"WebGPT", https://gpt3demo.com/apps/webgpt (accessed on Sep. 25, 2024), 3 pages.
Ferus, Jacob , "Experience the Future of Browsing: GPT-3 as Your Personal Navigator", Medium, https://medium.com/@dreamferus/experience-the-future-of-browsing-gpt-3-as-your-personal-navigator-fac0a100c9c9 (accessed on Sep. 25, 2024), Jan. 16, 2023, 9 pages.
Yao, Shunyu , et al., "WebShop: Towards Scalable Real-WorldWeb Interaction with Grounded Language Agents", arXiv:2207.01206v4 [cs.CL], https://arxiv.org/pdf/2207.01206 (accessed on Sep. 25, 2024), Feb. 8, 2023, 28 pages.
Ahn, Michael , et al., "Do As I Can, Not As I Say: Grounding Language in Robotic Affordances", arXiv:2204.01691v2 [cs.RO], https://arxiv.org/pdf/2204.01691 (accessed on Sep. 4, 2024), Aug. 16, 2022, 34 pages.
Artzi, Yoav , et al., "Weakly Supervised Learning of Semantic Parsers for Mapping Instructions to Actions", Transactions of the Association for Computational Linguistics (TACL), vol. 1, Mar. 2013, pp. 49-62.
Branavan, Satchuthananthavale RK, et al., "Reinforcement Learning for Mapping Instructions to Actions", Proceedings of the 47th Annual Meeting of the ACL and the 4th IJCNLP of the AFNLP, Suntec, Singapore, Aug. 2-7, 2009, pp. 82-90.
Brown, Tom B., et al., "Language Models are Few-Shot Learners", Advances in Neural Information Processing Systems (NeurIPS), 33, 2020, pp. 1877-1901.
Chase, Harrison , "Welcome to LangChain", https://web.archive.org/web/20230515182002/https://python.langchain.com/en/latest/index.html (accessed on Sep. 4, 2024), May 15, 2023, 5 pages.
Diaz, Oscar , et al., "User-Driven Automation of Web Form Filling", International Conference on Web Engineering (ICWE) 2013, Lecture Notes in Computer Science (LNCS) 7977, 2013, pp. 171-185.

Friedman, Nat , et al., Natbot: Drive a browser with gpt-3, https://github.com/nat/natbot (accessed on Sep. 4, 2024), 2022, 2 pages.
Gur, Izzeddin , et al., "Learning to Navigate the Web", arXiv:1812.09195v1 [cs.LG], https://arxiv.org/pdf/1812.09195 (accessed on Sep. 4, 2024), Dec. 21, 2018, 12 pages.
Gur, Izzeddin , et al., "Understanding HTML with Large Language Models", arXiv:2210.03945v2 [cs.LG], https://arxiv.org/pdf/2210.03945 (accessed on Sep. 4, 2024), May 19, 2023, 20 pages.
Huang, Wenlong , et al., "Inner Monologue: Embodied Reasoning through Planning with Language Models", arXiv:2207.05608v1 [cs.RO], https://arxiv.org/pdf/2207.05608 (accessed on Sep. 4, 2024), Jul. 12, 2022, 25 pages.
Humphreys, Peter , et al., "A Data-Driven Approach for Learning to Control Computers", arXiv:2202.08137v2 [cs.LG], https://arxiv.org/pdf/2202.08137 (accessed on Sep. 4, 2024), Nov. 11, 2022, 17 pages.
Jia, Sheng , et al., "DOM-Q-NET: Grounded RL on Structured Language", Published as a conference paper at International Conference on Learning Representations (ICLR) 2019, arXiv:1902.07257v1 [cs.LG], https://arxiv.org/pdf/1902.07257, Feb. 19, 2019, 17 pages.
Li, Yang , et al., "Mapping Natural Language Instructions to Mobile UI Action Sequences", Proceedings of the 58th Annual Meeting of the Association for Computational Linguistics, Jul. 5-10, 2020, pp. 8198-8210.
Li, Yang , et al., "Mapping Natural Language Instructions to Mobile UI Action Sequences", arXiv:2005.03776v2 [cs.CL], https://arxiv.org/pdf/2005.03776 (accessed on Sep. 4, 2024), Jun. 5, 2020, 13 pages.
Liang, Jacky , et al., "Code as Policies: Language Model Programs for Embodied Control", arXiv:2209.07753v4 [cs.RO], https://arxiv.org/pdf/2209.07753 (accessed on Sep. 4, 2024), May 25, 2023, 16 pages.
Liu, Evan Zheran, et al., "Reinforcement Learning on Web Interfaces Using Workflow-Guided Exploration", Published as a conference paper at International Conference on Learning Representations (ICLR) 2018, arXiv:1802.08802v1 [cs.AI], https://arxiv.org/pdf/1802.08802 (accessed on Sep. 4, 2024), Feb. 24, 2018, 15 pages.
Nakano, Reiichiro , et al., "WebGPT: Browser-assisted question-answering with human feedback", arXiv:2112.09332v3 [cs.CL], https://arxiv.org/pdf/2112.09332 (accessed on Sep. 4, 2024), Jun. 1, 2022, 32 pages.
Nogueira, Rodrigo , et al., "End-to-End Goal-Driven Web Navigation", 30th Conference on Neural Information Processing Systems (NIPS 2016), Barcelona, Spain, Advances in Neural Information Processing Systems, vol. 29, 2016, 9 pages.
Open AI , "ChatGPT plugins", https://openai.com/index/chatgpt-plugins/ (accessed on Sep. 4, 2024), Mar. 23, 2023, 25 pages.
OpenAI , "GPT-4 Technical Report", arXiv:submit/4812508 [cs.CL], https://cdn.openai.com/papers/gpt-4.pdf (accessed on Sep. 4, 2024), Mar. 27, 2023, 100 pages.
Ouyang, Long , et al., "Training language models to follow instructions with human feedback", arXiv:2203.02155v1 [cs.CL], https://arxiv.org/pdf/2203.02155.pdf (accessed on Oct. 24, 2023), Mar. 4, 2022, 68 pages.
Pasupat, Panupong , et al., "Mapping natural language commands to web elements", Proceedings of the 2018 Conference on Empirical Methods in Natural Language Processing (EMNLP), Brussels, Belgium, Oct. 31-Nov. 4, 2018, pp. 4970-4976.
Schick, Timo , et al., "Toolformer: Language Models Can Teach Themselves to Use Tools", arXiv:2302.04761v1 [cs.CL], https://arxiv.org/pdf/2302.04761 (accessed on Sep. 4, 2024), Feb. 9, 2023, 17 pages.
Shi, Tianlin (Tim) , et al., "World of Bits: An Open-Domain Platform forWeb-Based Agents", Proceedings of the 34th International Conference on Machine Learning (ICML), Sydney, Australia, PMLR 70, 2017, 10 pages.
Wei, Jason , et al., "Chain-of-Thought Prompting Elicits Reasoning in Large Language Models", arXiv:2201.11903v6 [cs.CL], https://arxiv.org/pdf/2201.11903 (accessed on Sep. 4, 2024), Jan. 10, 2023, 43 pages.
Yao, Shunyu , et al., "ReAct: Synergizing Reasoning and Acting in Language Models", Published as a conference paper at ICLR 2023,

(56)                    References Cited

OTHER PUBLICATIONS arXiv:2210.03629v3 [cs.CL], https://arxiv.org/pdf/2210.03629 (accessed on Sep. 4, 2024), Mar. 10, 2023, 33 pages.
Yao, Shunyu , et al., "WebShop: Towards Scalable Real-WorldWeb Interaction with Grounded Language Agents", 36th Conference on Neural Information Processing Systems (NeurIPS 2022), 2022, 14 pages.
Zaheer, Manzil , et al., "Learning to Navigate Wikipedia by Taking RandomWalks", 36th Conference on Neural Information Processing Systems (NeurIPS 2022)., 2022, 13 pages.

\* cited by examiner

ACME Airlines

Round trip flight search page

Departure City: ⟋210

Arrival City: ⟋230

Departure Date: ⟋220

Return Date: ⟋240

Search ⟋150

⟋200

Collect web browser data ⟋110

Convert web browser data to prompt templates ⟋120

Use prompt templates to automate web browsing task ⟋130

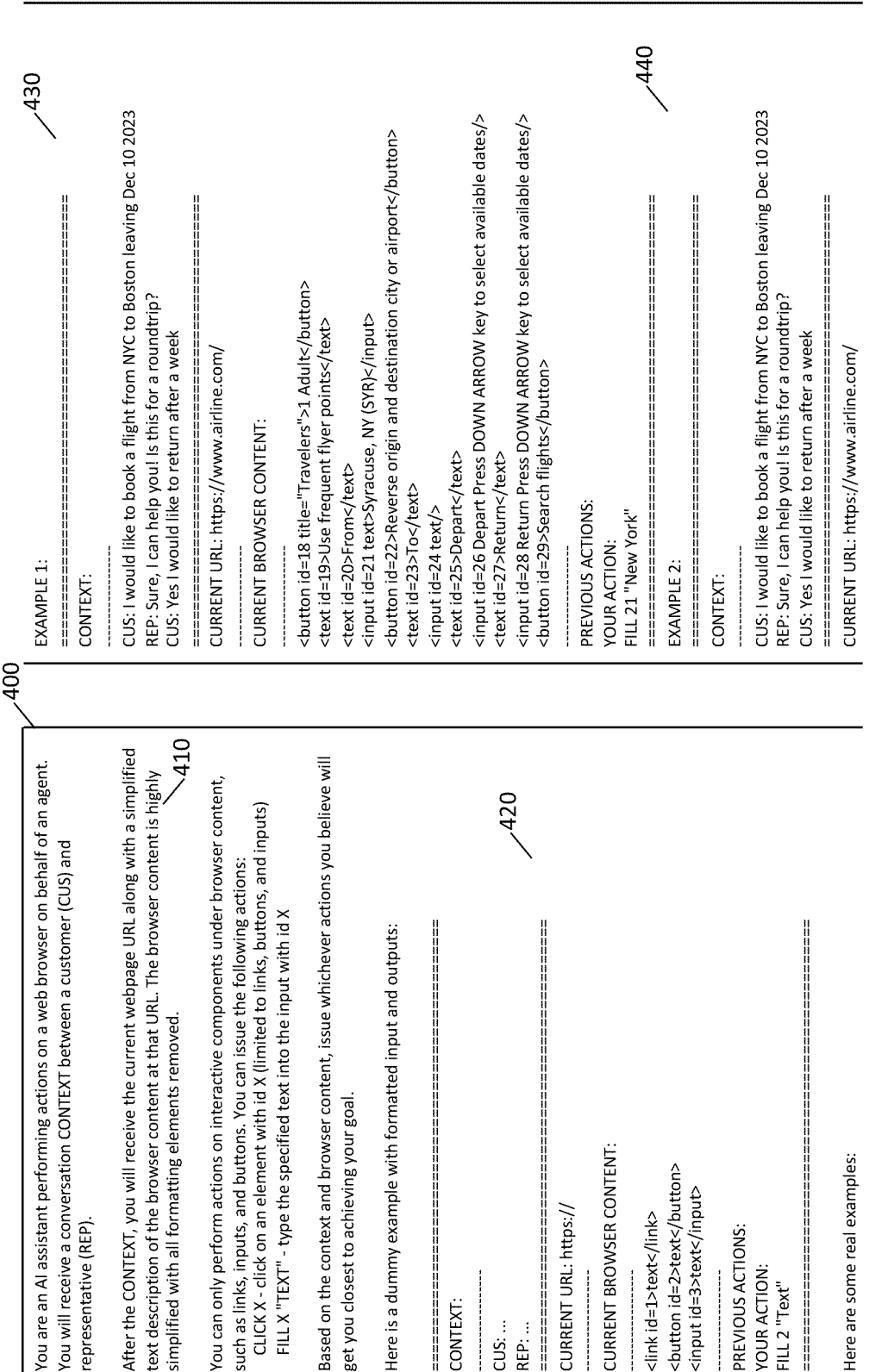

400

You are an AI assistant performing actions on a web browser on behalf of an agent. You will receive a conversation CONTEXT between a customer (CUS) and representative (REP).

After the CONTEXT, you will receive the current webpage URL along with a simplified text description of the browser content at that URL. The browser content is highly simplified with all formatting elements removed.

410

You can only perform actions on interactive components under browser content, such as links, inputs, and buttons. You can issue the following actions:
CLICK X - click on an element with id X (limited to links, buttons, and inputs)
FILL X "TEXT" - type the specified text into the input with id X Based on the context and browser content, issue whichever actions you believe will get you closest to achieving your goal.

Here is a dummy example with formatted input and outputs:

=============================================
CONTEXT:
--------
CUS: ...
REP: ...
=============================================
CURRENT URL: https://

CURRENT BROWSER CONTENT:
--------
<link id=1>text</link>
<button id=2>text</button>
<input id=3>text</input>
--------
PREVIOUS ACTIONS:
YOUR ACTION:
FILL 2 "Text"
=============================================

Here are some real examples:

420

EXAMPLE 1:
=============================================
CONTEXT:
--------
CUS: I would like to book a flight from NYC to Boston leaving Dec 10 2023
REP: Sure, I can help you! Is this for a roundtrip?
CUS: Yes I would like to return after a week
=============================================
CURRENT URL: https://www.airline.com/

CURRENT BROWSER CONTENT:
--------
<button id=18 title="Travelers">1 Adult</button>
<text id=19>Use frequent flyer points</text>
<text id=20>From</text>
<input id=21 text>Syracuse, NY (SYR)</input>
<button id=22>Reverse origin and destination city or airport</button>
<text id=23>To</text>
<input id=24 text/>
<text id=25>Depart</text>
<input id=26 Depart Press DOWN ARROW key to select available dates/>
<text id=27>Return</text>
<input id=28 Return Press DOWN ARROW key to select available dates/>
<button id=29>Search flights</button>
--------
PREVIOUS ACTIONS:
YOUR ACTION:
FILL 21 "New York"
=============================================

430

EXAMPLE 2:
=============================================
CONTEXT:
--------
CUS: I would like to book a flight from NYC to Boston leaving Dec 10 2023
REP: Sure, I can help you! Is this for a roundtrip?
CUS: Yes I would like to return after a week
=============================================
CURRENT URL: https://www.airline.com/

Figure 4B:
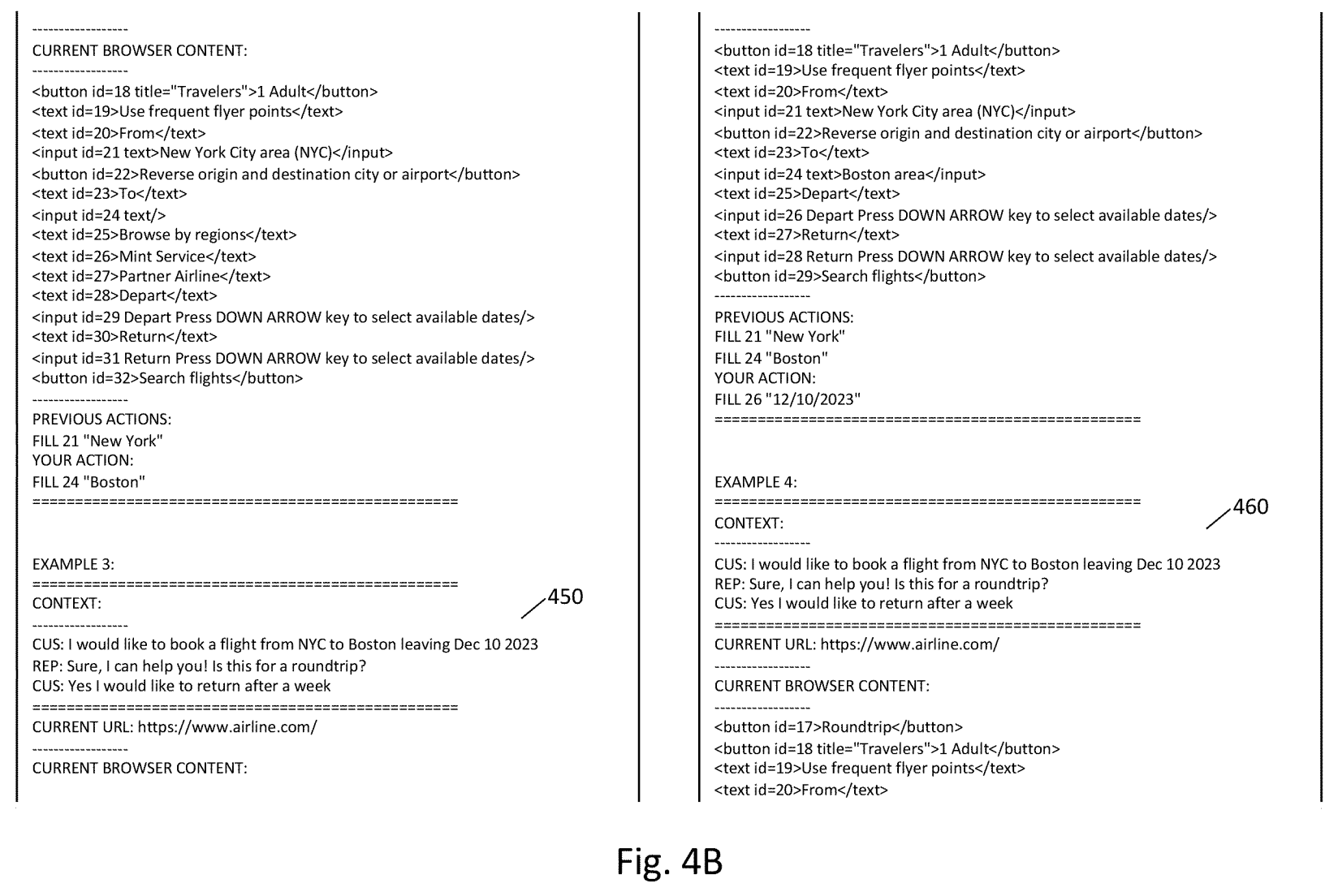

CURRENT BROWSER CONTENT:
--------
<button id=18 title="Travelers">1 Adult</button>
<text id=19>Use frequent flyer points</text>
<text id=20>From</text>
<input id=21 text>New York City area (NYC)</input>
<button id=22>Reverse origin and destination city or airport</button>
<text id=23>To</text>
<input id=24 text/>
<text id=25>Browse by regions</text>
<text id=26>Mint Service</text>
<text id=27>Partner Airlines</text>
<text id=28>Depart</text>
<input id=29 Depart Press DOWN ARROW key to select available dates/>
<text id=30>Return</text>
<input id=31 Return Press DOWN ARROW key to select available dates/>
<button id=32>Search flights</button>
--------
PREVIOUS ACTIONS:
FILL 21 "New York"
YOUR ACTION:
FILL 24 "Boston"
========

EXAMPLE 3:
========
CONTEXT:
--------
CUS: I would like to book a flight from NYC to Boston leaving Dec 10 2023
REP: Sure, I can help you! Is this for a roundtrip?
CUS: Yes I would like to return after a week
========
CURRENT URL: https://www.airline.com/
--------
CURRENT BROWSER CONTENT:

/450

--------
<button id=18 title="Travelers">1 Adult</button>
<text id=19>Use frequent flyer points</text>
<text id=20>From</text>
<input id=21 text>New York City area (NYC)</input>
<button id=22>Reverse origin and destination city or airport</button>
<text id=23>To</text>
<input id=24 text>Boston area</input>
<text id=25>Depart</text>
<input id=26 Depart Press DOWN ARROW key to select available dates/>
<text id=27>Return</text>
<input id=28 Return Press DOWN ARROW key to select available dates/>
<button id=29>Search flights</button>
--------
PREVIOUS ACTIONS:
FILL 21 "New York"
FILL 24 "Boston"
YOUR ACTION:
FILL 26 "12/10/2023"
========

EXAMPLE 4:
========
CONTEXT:
--------
CUS: I would like to book a flight from NYC to Boston leaving Dec 10 2023
REP: Sure, I can help you! Is this for a roundtrip?
CUS: Yes I would like to return after a week
========
CURRENT URL: https://www.airline.com/
--------
CURRENT BROWSER CONTENT:
--------
<button id=17>Roundtrip</button>
<button id=18 title="Travelers">1 Adult</button>
<text id=19>Use frequent flyer points</text>
<text id=20>From</text>

```
<input id=21 text>New York City area (NYC)</input>
<button id=22>Reverse origin and destination city or airport</button>
<text id=23>To</text>
<input id=24 text>Boston area</input>
<text id=25>Depart</text>
<input id=26 Depart Press DOWN ARROW key to select available dates>Fri Dec 10</input>
<text id=27>Return</text>
<input id=28 Return Press DOWN ARROW key to select available dates/>
<button id=29>Search flights</button>

PREVIOUS ACTIONS:
FILL 21 "New York"
FILL 24 "Boston"
FILL 26 "12/10/2023"
YOUR ACTION:
FILL 28 "12/17/2023"
=====================================================

EXAMPLE 5:
=====================================================
CONTEXT:
=====================================================
CUS: I would like to book a flight from NYC to Boston leaving Dec 10 2023
REP: Sure, I can help you! Is this for a roundtrip?
CUS: Yes I would like to return after a week
=====================================================
CURRENT URL: https://www.airline.com/
---
CURRENT BROWSER CONTENT:
---
<text id=19>Use frequent flyer points</text>
<text id=20>From</text>
<input id=21 text>New York City area (NYC)</input>
<button id=22>Reverse origin and destination city or airport</button>
<text id=23>To</text>
<input id=24 text>Boston area</input>
```
/470

```
<text id=25>Depart</text>
<input id=26 Depart Press DOWN ARROW key to select available dates>Fri Dec 10</input>
<text id=27>Return</text>
<input id=28 Return Press DOWN ARROW key to select available dates>Fri Dec 17</input>
<button id=29>Search flights</button>

PREVIOUS ACTIONS:
FILL 21 "New York"
FILL 24 "Boston"
FILL 26 "12/10/2023"
FILL 28 "12/17/2023"
YOUR ACTION:
CLICK 29
=====================================================

The current context, url, and browser content follow. Reply with your next action to the browser.
=====================================================
CONTEXT:
---
{context}
=====================================================
CURRENT URL: {url}
---
CURRENT BROWSER CONTENT:
---
{browser_content}
---
PREVIOUS ACTIONS: {previous_actions}
YOUR ACTION:
```
/480

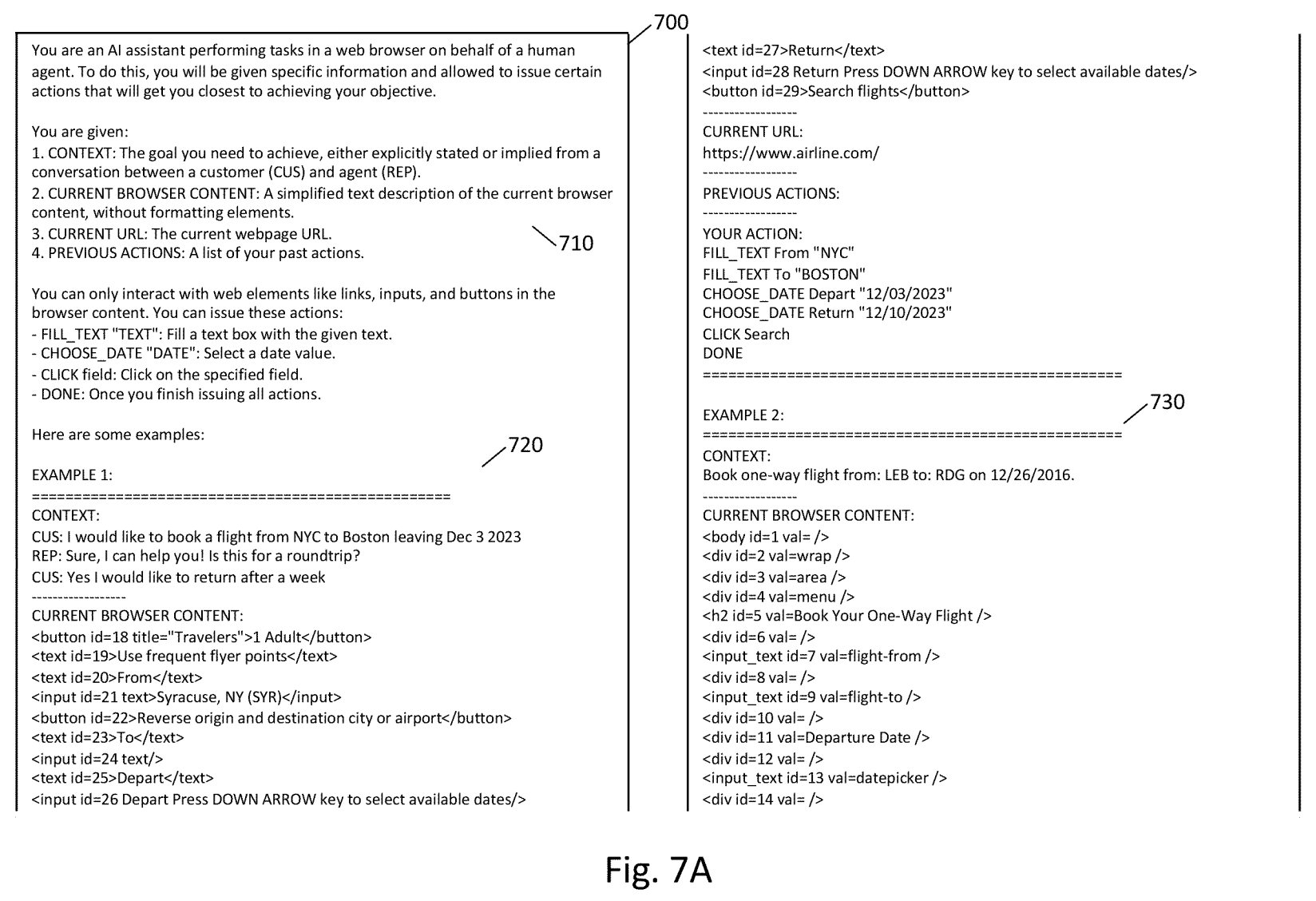

You are an AI assistant performing tasks in a web browser on behalf of a human agent. To do this, you will be given specific information and allowed to issue certain actions that will get you closest to achieving your objective.

You are given:
1. CONTEXT: The goal you need to achieve, either explicitly stated or implied from a conversation between a customer (CUS) and agent (REP).
2. CURRENT BROWSER CONTENT: A simplified text description of the current browser content, without formatting elements.
3. CURRENT URL: The current webpage URL.
4. PREVIOUS ACTIONS: A list of your past actions.

710

You can only interact with web elements like links, inputs, and buttons in the browser content. You can issue these actions:
- FILL_TEXT "TEXT": Fill a text box with the given text.
- CHOOSE_DATE "DATE": Select a date value.
- CLICK field: Click on the specified field.
- DONE: Once you finish issuing all actions.

Here are some examples:

EXAMPLE 1:
===============================================
720

CONTEXT:
CUS: I would like to book a flight from NYC to Boston leaving Dec 3 2023
REP: Sure, I can help you! Is this for a roundtrip?
CUS: Yes I would like to return after a week
---------
CURRENT BROWSER CONTENT:
<button id=18 title="Travelers">1 Adult</button>
<text id=19>Use frequent flyer points</text>
<text id=20>From</text>
<input id=21 text>Syracuse, NY (SYR)</input>
<button id=22>Reverse origin and destination city or airport</button>
<text id=23>To</text>
<input id=24 text/>
<text id=25>Depart</text>
<input id=26 Depart Press DOWN ARROW key to select available dates/>
<text id=27>Return</text>
<input id=28 Return Press DOWN ARROW key to select available dates/>
<button id=29>Search flights</button>
---------
CURRENT URL:
https://www.airline.com/
---------
PREVIOUS ACTIONS:
---------
YOUR ACTION:
FILL_TEXT From "NYC"
FILL_TEXT To "BOSTON"
CHOOSE_DATE Depart "12/03/2023"
CHOOSE_DATE Return "12/10/2023"
CLICK Search
DONE
===============================================

730

EXAMPLE 2:
===============================================

CONTEXT:
Book one-way flight from: LEB to: RDG on 12/26/2016.
---------
CURRENT BROWSER CONTENT:
<body id=1 val= />
<div id=2 val=wrap />
<div id=3 val=area />
<div id=4 val=menu />
<h2 id=5 val=Book Your One-Way Flight />
<div id=6 val= />
<input_text id=7 val=flight-from />
<div id=8 val= />
<input_text id=9 val=flight-to />
<div id=10 val= />
<div id=11 val=Departure Date />
<div id=12 val= />
<input_text id=13 val=datepicker />
<div id=14 val= />

Fig. 7A

```
<button id=15 val=Search />
<div id=16 val= />
<div id=23 val=1 result is available, use up and down arrow keys to navigate. />
<div id=18 val= />
<div id=27 val=1 result is available, use up and down arrow keys to navigate. />
---------
CURRENT URL:
https://www.airline.com/
---------
PREVIOUS ACTIONS:
---------
YOUR ACTION:
FILL_TEXT flight-from "LEB"
FILL_TEXT flight-to "RDG"
CHOOSE_DATE datepicker "12/26/2016"
CLICK Search
DONE
=================================                              740
=================================

The current context, browser content, and url follow. Reply with your next action to
the browser.

=================================
=================================
CONTEXT:
{context}
---------
CURRENT BROWSER CONTENT:
{browser_content}
---------
CURRENT URL:
{url}
---------
PREVIOUS ACTIONS:
{previous_actions}
---------
YOUR ACTION:
```

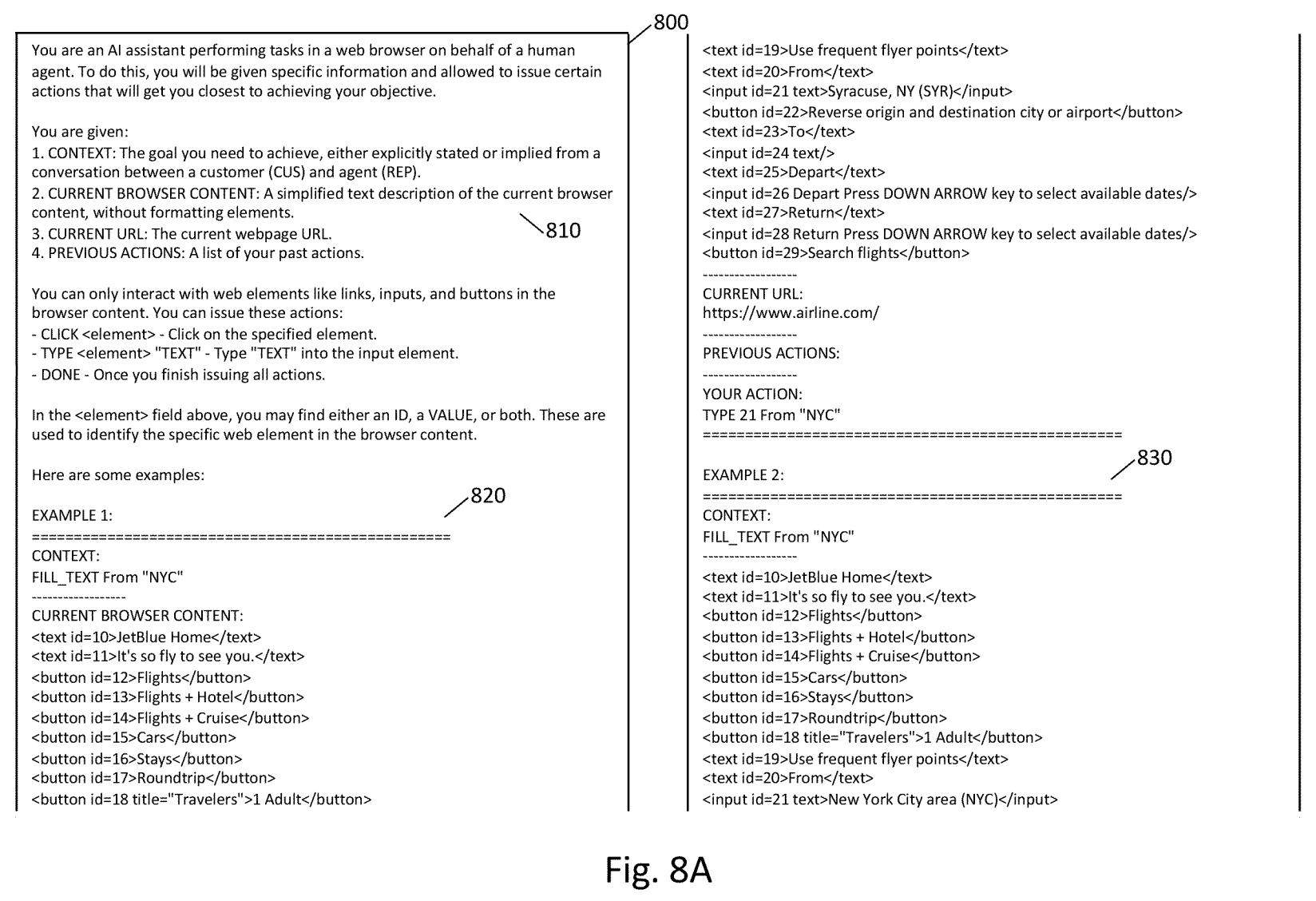

You are an AI assistant performing tasks in a web browser on behalf of a human agent. To do this, you will be given specific information and allowed to issue certain actions that will get you closest to achieving your objective.

You are given:
1. CONTEXT: The goal you need to achieve, either explicitly stated or implied from a conversation between a customer (CUS) and agent (REP).
2. CURRENT BROWSER CONTENT: A simplified text description of the current browser content, without formatting elements.                                          810
3. CURRENT URL: The current webpage URL.
4. PREVIOUS ACTIONS: A list of your past actions.

You can only interact with web elements like links, inputs, and buttons in the browser content. You can issue these actions:
- CLICK <element> - Click on the specified element.
- TYPE <element> "TEXT" - Type the "TEXT" into the input element.
- DONE - Once you finish issuing all actions.

In the <element> field above, you may find either an ID, a VALUE, or both. These are used to identify the specific web element in the browser content.

Here are some examples:                                          820

EXAMPLE 1:
================================

CONTEXT:
FILL_TEXT From "NYC"
------------
CURRENT BROWSER CONTENT:
<text id=10>JetBlue Home</text>
<text id=11>It's so fly to see you.</text>
<button id=12>Flights</button>
<button id=13>Flights + Hotel</button>
<button id=14>Flights + Cruise</button>
<button id=15>Cars</button>
<button id=16>Stays</button>
<button id=17>Roundtrip</button>
<button id=18 title="Travelers">1 Adult</button>

<text id=19>Use frequent flyer points</text>
<text id=20>From</text>
<input id=21 text>Syracuse, NY (SYR)</input>
<button id=22>Reverse origin and destination city or airport</button>
<text id=23>To</text>
<input id=24 text/>
<text id=25>Depart</text>
<input id=26 Depart Press DOWN ARROW key to select available dates/>
<text id=27>Return</text>
<input id=28 Return Press DOWN ARROW key to select available dates/>
<button id=29>Search flights</button>
------------
CURRENT URL:
https://www.airline.com/
------------
PREVIOUS ACTIONS:

------------
YOUR ACTION:
TYPE 21 From "NYC"
================================                                          830

EXAMPLE 2:
================================

CONTEXT:
FILL_TEXT From "NYC"
------------
<text id=10>JetBlue Home</text>
<text id=11>It's so fly to see you.</text>
<button id=12>Flights</button>
<button id=13>Flights + Hotel</button>
<button id=14>Flights + Cruise</button>
<button id=15>Cars</button>
<button id=16>Stays</button>
<button id=17>Roundtrip</button>
<button id=18 title="Travelers">1 Adult</button>
<text id=19>Use frequent flyer points</text>
<text id=20>From</text>
<input id=21 text>New York City area (NYC)</input>

Fig. 8A

```
<button id=22>Reverse origin and destination city or airport</button>
<text id=23>To</text>
<input id=24 text/>
<text id=25>Browse by regions</text>
<text id=26>Mint Service</text>
<text id=27>Partner Airline</text>
<text id=28>Depart</text>
<input id=29 Depart Press DOWN ARROW key to select available dates/>
<text id=30>Return</text>
<input id=31 Return Press DOWN ARROW key to select available dates/>
<button id=32>Search flights</button>

CURRENT URL:
https://www.airline.com/

PREVIOUS ACTIONS:
TYPE 21 From "NYC"

YOUR ACTION:
DONE
============================= / 840
=============================

EXAMPLE 3:
=============================
CONTEXT:
FILL_TEXT flight-from "LEB"

CURRENT BROWSER CONTENT:
<body id=1 val= />
<div id=2 val=wrap />
<div id=3 val=area />
<div id=4 val=menu />
<h2 id=5 val=Book Your One-Way Flight />
<div id=6 val= />
<input_text id=7 val=flight-from />
<div id=8 val= />
<input_text id=9 val=flight-to />
<div id=10 val= />
```

```
<div id=11 val=Departure Date />
<div id=12 val= />
<input_text id=13 val=datepicker />
<div id=14 val= />
<button id=15 val=Search />
<div id=16 val= />
<div id=17 val= />

CURRENT URL:
https://www.airline.com/

PREVIOUS ACTIONS:

YOUR ACTION:
TYPE 7 flight-from "LEB"
============================= / 850
=============================

EXAMPLE 4:
=============================
CONTEXT:
FILL_TEXT flight-from "LEB"

CURRENT BROWSER CONTENT:
<body id=1 val= />
<div id=2 val=wrap />
<div id=3 val=area />
<div id=4 val=menu />
<h2 id=5 val=Book Your One-Way Flight />
<div id=6 val= />
<input_text id=7 val=flight-from />
<div id=8 val= />
<input_text id=9 val=flight-to />
<div id=10 val= />
<div id=11 val=Departure Date />
<div id=12 val= />
<input_text id=13 val=datepicker />
<div id=14 val= />
<button id=15 val=Search />
```

Fig. 8B

```
<ul id=18 val=ui-id-1 />
<li id=19 val= />
<div id=20 val=Hanover, NH (HNV) />
<li id=21 val= />
<div id=22 val=Lebanon, NH (LEB) />
<li id=23 val= />
<div id=24 val=White River, VT (WHR) />
<div id=16 val= />
<div id=25 val=3 results are available, use up and down arrow keys to navigate. />
<div id=17 val= />

CURRENT URL:
https://www.airline.com/

PREVIOUS ACTIONS:
TYPE 7 flight-from "LEB"

YOUR ACTION:
CLICK 22 Lebanon, NH (LEB)
===================================  /860
===================================

EXAMPLE 5:
===================================
===================================

CONTEXT:
FILL_TEXT flight-from "LEB"

CURRENT BROWSER CONTENT:
<body id=1 val= />
<div id=2 val=wrap />
<div id=3 val=area />
<div id=4 val=menu />
<h2 id=5 val=Book Your One-Way Flight />
<div id=6 val= />
<input_text id=7 val=flight-from />
<div id=8 val= />
<input_text id=9 val=flight-to />
<div id=10 val= />
<div id=11 val=Departure Date />
```

```
<div id=12 val= />
<input_text id=13 val=datepicker />
<div id=14 val= />
<button id=15 val=Search />
<div id=16 val= />
<div id=25 val=3 results are available, use up and down arrow keys to navigate. />
<div id=17 val= />

CURRENT URL:
https://

PREVIOUS ACTIONS:
TYPE 7 flight-from "LEB"
CLICK 22 Lebanon, NH (LEB)

YOUR ACTION:
DONE
===================================  /870

The current context, browser content, and url follow. Reply with your next action to
the browser.
===================================
===================================

CONTEXT:
{context}

CURRENT BROWSER CONTENT:
{browser_content}

CURRENT URL:
{url}

PREVIOUS ACTIONS:
{previous_actions}

YOUR ACTION:
```

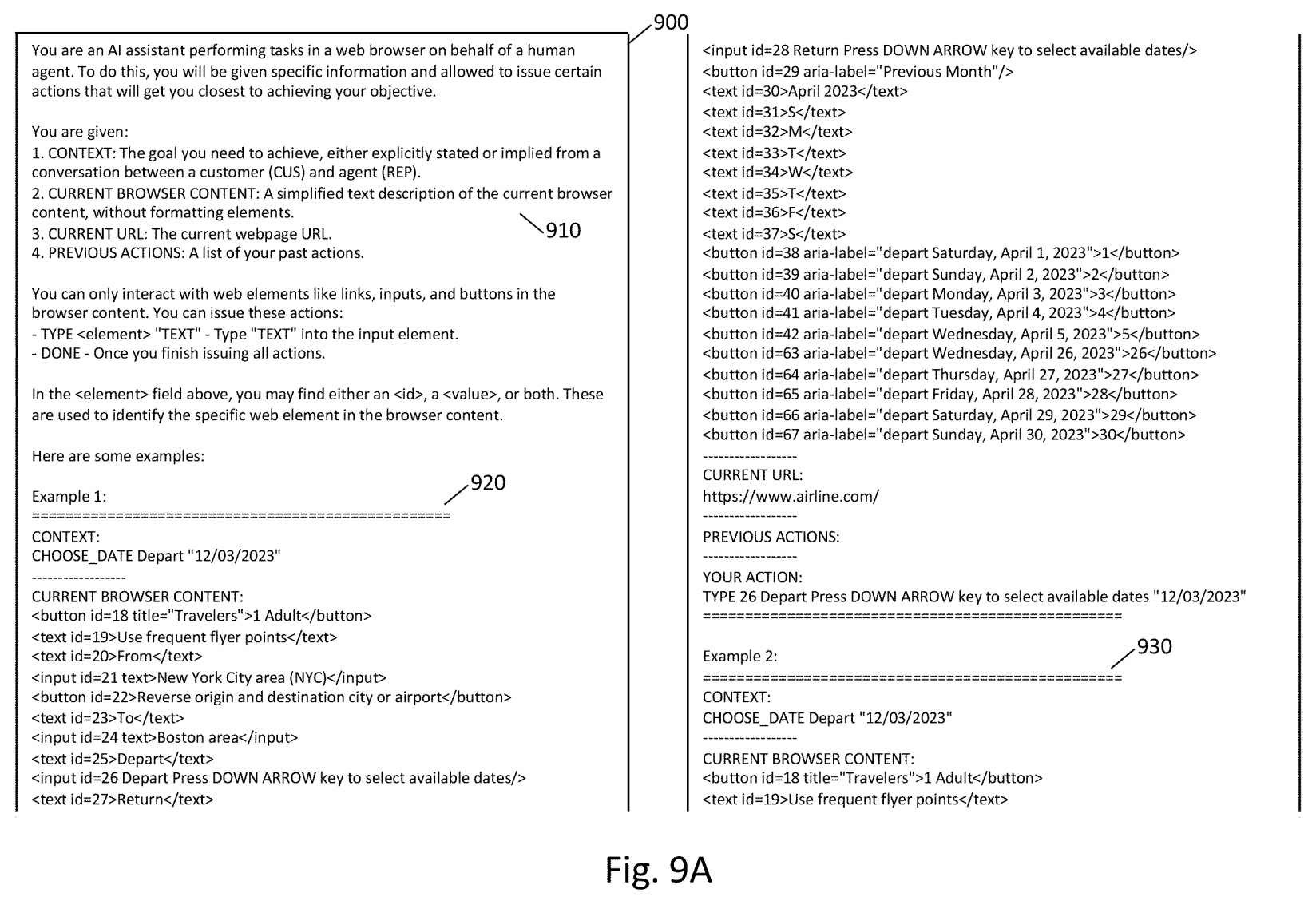

You are an AI assistant performing tasks in a web browser on behalf of a human agent. To do this, you will be given specific information and allowed to issue certain actions that will get you closest to achieving your objective.

You are given:
1. CONTEXT: The goal you need to achieve, either explicitly stated or implied from a conversation between a customer (CUS) and agent (REP).
2. CURRENT BROWSER CONTENT: A simplified text description of the current browser content, without formatting elements.  ⟍910
3. CURRENT URL: The current webpage URL.
4. PREVIOUS ACTIONS: A list of your past actions.

You can only interact with web elements like links, inputs, and buttons in the browser content. You can issue these actions:
- TYPE <element> "TEXT" - Type "TEXT" into the input element.
- DONE - Once you finish issuing all actions.

In the <element> field above, you may find either an <id>, a <value>, or both. These are used to identify the specific web element in the browser content.

Here are some examples:

Example 1:
==============
CONTEXT:
CHOOSE_DATE Depart "12/03/2023"  ⟍920
----------
CURRENT BROWSER CONTENT:
<button id=18 title="Travelers">1 Adult</button>
<text id=19>Use frequent flyer points</text>
<text id=20>From></text>
<input id=21 text>New York City area (NYC)</input>
<button id=22>Reverse origin and destination city or airport</button>
<text id=23>To</text>
<input id=24 text>Boston area</input>
<text id=25>Depart</text>
<input id=26 Depart Press DOWN ARROW key to select available dates/>
<text id=27>Return</text>

<input id=28 Return Press DOWN ARROW key to select available dates/>
<button id=29 aria-label="Previous Month"/>
<text id=30>April 2023</text>
<text id=31>S</text>
<text id=32>M</text>
<text id=33>T</text>
<text id=34>W</text>
<text id=35>T</text>
<text id=36>F</text>
<text id=37>S</text>
<button id=38 aria-label="depart Saturday, April 1, 2023">1</button>
<button id=39 aria-label="depart Sunday, April 2, 2023">2</button>
<button id=40 aria-label="depart Monday, April 3, 2023">3</button>
<button id=41 aria-label="depart Tuesday, April 4, 2023">4</button>
<button id=42 aria-label="depart Wednesday, April 5, 2023">5</button>
<button id=63 aria-label="depart Wednesday, April 26, 2023">26</button>
<button id=64 aria-label="depart Thursday, April 27, 2023">27</button>
<button id=65 aria-label="depart Friday, April 28, 2023">28</button>
<button id=66 aria-label="depart Saturday, April 29, 2023">29</button>
<button id=67 aria-label="depart Sunday, April 30, 2023">30</button>
----------
CURRENT URL:
https://www.airline.com/
----------
PREVIOUS ACTIONS:
----------
YOUR ACTION:
TYPE 26 Depart Press DOWN ARROW key to select available dates "12/03/2023"
==============

Example 2:
==============  ⟍930
CONTEXT:
CHOOSE_DATE Depart "12/03/2023"
----------
CURRENT BROWSER CONTENT:
<button id=18 title="Travelers">1 Adult</button>
<text id=19>Use frequent flyer points</text>

Fig. 9A

```
<text id=20>From</text>
<input id=21 text>New York City area (NYC)</input>
<button id=22>Reverse origin and destination city or airport</button>
<text id=23>To</text>
<input id=24 text>Boston area</input>
<text id=25>Depart</text>
<input id=26 Depart Press DOWN ARROW key to select available dates>Sun Dec 3</input>
<text id=27>Return</text>
<input id=28 Return Press DOWN ARROW key to select available dates/>
<button id=29 aria-label="Previous Month"/>
<text id=30>December 2023</text>
<text id=31>S</text>
<text id=32>M</text>
<text id=33>T</text>
<text id=34>W</text>
<text id=35>T</text>
<text id=36>F</text>
<text id=37>S</text>
<button id=38 aria-label="depart Friday, December 1, 2023">1</button>
<button id=39 aria-label="depart Saturday, December 2, 2023">2</button>
<button id=40 aria-label="depart Sunday, December 3, 2023">3</button>
<button id=41 aria-label="depart Monday, December 4, 2023">4</button>
<button id=42 aria-label="depart Tuesday, December 5, 2023">5</button>
<button id=63 aria-label="return Tuesday, December 26, 2023">26</button>
<button id=64 aria-label="return Wednesday, December 27, 2023">27</button>
<button id=65 aria-label="return Thursday, December 28, 2023">28</button>
<button id=66 aria-label="return Friday, December 29, 2023">29</button>
<button id=67 aria-label="return Saturday, December 30, 2023">30</button>
<button id=68 aria-label="return Sunday, December 31, 2023">31</button>

CURRENT URL:
https://www.airline.com/

PREVIOUS ACTIONS:
TYPE 26 Depart Press DOWN ARROW key to select available dates "12/03/2023"

YOUR ACTION:
```

```
DONE
===========================================================
Example 3:                                              940
===========================================================
CONTEXT:
CHOOSE_DATE datepicker "12/26/2016"
===========================================================
CURRENT BROWSER CONTENT:
<h2 id=5 val=Book Your One-Way Flight />
<input_text id=7 val=flight-from />
<input_text id=9 val=flight-to />
<div id=11 val=Departure Date />
<input_text id=13 val=datepicker />
<button id=15 val=Search />
<div id=16 val= />
<div id=21 val=1 result is available, use up and down arrow keys to navigate. />
<ul id=22 val=ui-id-2 />
<li id=23 val= />
<div id=24 val=Barter Island, AK (BTI) />
<li id=25 val= />
<div id=26 val=Beaumont/Port Arthur, TX (BPT) />
<li id=27 val= />
<div id=28 val=Greenville/Spartanburg, SC (GSP) />
<li id=29 val= />
<div id=30 val=Hartford, CT (BDL) />
<li id=31 val= />
<div id=32 val=Martha's Vineyard, MA (MVY) />
<li id=33 val= />
<div id=47 val=12 results are available, use up and down arrow keys to navigate. />

CURRENT URL:
https://www.airline.com/

PREVIOUS ACTIONS:

YOUR ACTION:
CLICK 13 datepicker
```

Fig. 9B

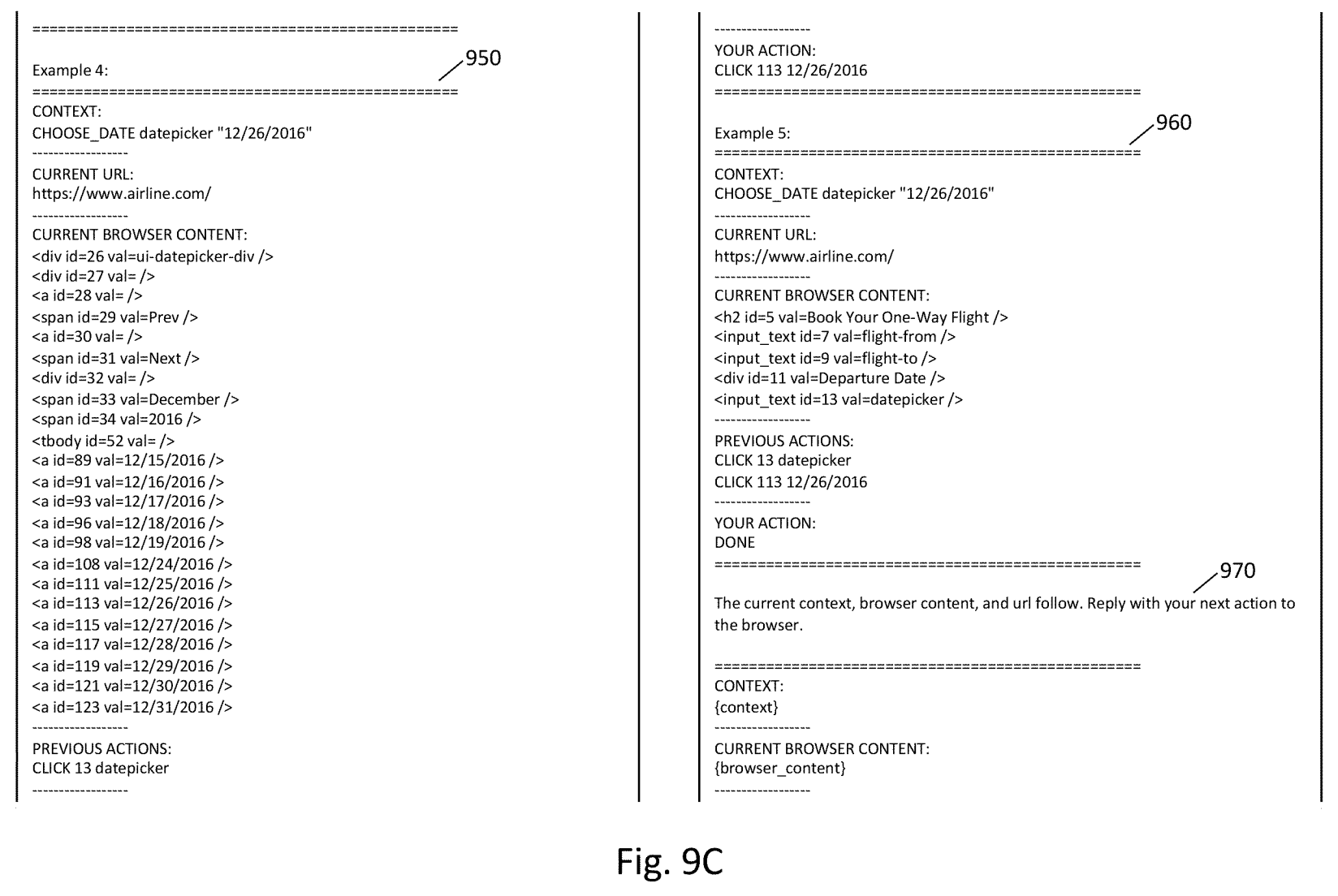

Example 4:

CONTEXT:
CHOOSE_DATE datepicker "12/26/2016"

CURRENT URL:
https://www.airline.com/

CURRENT BROWSER CONTENT:
<div id=26 val=ui-datepicker-div />
<div id=27 val= />
<a id=28 val= />
<span id=29 val=Prev />
<a id=30 val= />
<span id=31 val=Next />
<div id=32 val= />
<span id=33 val=December />
<span id=34 val=2016 />
<tbody id=52 val= />
<a id=89 val=12/15/2016 />
<a id=91 val=12/16/2016 />
<a id=93 val=12/17/2016 />
<a id=96 val=12/18/2016 />
<a id=98 val=12/19/2016 />
<a id=108 val=12/24/2016 />
<a id=111 val=12/25/2016 />
<a id=113 val=12/26/2016 />
<a id=115 val=12/27/2016 />
<a id=117 val=12/28/2016 />
<a id=119 val=12/29/2016 />
<a id=121 val=12/30/2016 />
<a id=123 val=12/31/2016 />

PREVIOUS ACTIONS:
CLICK 13 datepicker

950

YOUR ACTION:
CLICK 113 12/26/2016

960

Example 5:

CONTEXT:
CHOOSE_DATE datepicker "12/26/2016"

CURRENT URL:
https://www.airline.com/

CURRENT BROWSER CONTENT:
<h2 id=5 val=Book Your One-Way Flight />
<input_text id=7 val=flight-from />
<input_text id=9 val=flight-to />
<div id=11 val=Departure Date />
<input_text id=13 val=datepicker />

PREVIOUS ACTIONS:
CLICK 13 datepicker
CLICK 113 12/26/2016

YOUR ACTION:
DONE

970

The current context, browser content, and url follow. Reply with your next action to the browser.

CONTEXT:
{context}

CURRENT BROWSER CONTENT:
{browser_content}

Fig. 9C

CURRENT URL:
{url}
-----------
PREVIOUS ACTIONS:
{previous_actions}
-----------
YOUR ACTION:

AUTOMATION OF TASKS USING LANGUAGE MODEL PROMPTS

CROSS-REFERENCE TO RELATED APPLICATIONS

This application claims the benefit of priority to U.S. Provisional Patent Application No. 63/467,211, filed 17 May 2023 entitled "PROMPTS ALL THE WAY: LEARNING COMPOSABLE POLICIES FOR WEB TASKS."

This application claims the benefit of priority to U.S. Provisional Patent Application No. 63/468,722, filed 24 May 2023 entitled "PROMPTS ALL THE WAY: LEARNING COMPOSABLE POLICIES FOR WEB TASKS."

The foregoing applications are incorporated herein by reference in their entirety for all purposes.

BACKGROUND

Automation has become increasingly prevalent in various industries and sectors, aiming to streamline processes, enhance efficiency, and reduce human effort. Traditional automation systems often require explicit programming or scripting, limiting their usability to individuals with technical expertise. However, there remains a need for automation solutions that are accessible to a broader range of users, including non-technical individuals.

In recent years, natural language processing (NLP) techniques have gained significant attention and advancement. NLP involves the interaction between computers and human language, enabling systems to understand, interpret, and respond to natural language inputs. By leveraging NLP capabilities, it becomes possible to develop automation systems that can understand and execute tasks based on human language instructions.

SUMMARY

In some aspects, the techniques described herein relate to a computer-implemented method, including: receiving instruction text including instructions for accomplishing a task on a website; selecting a task prompt template using the instruction text, wherein the task prompt template includes a first task prompt example of an action implemented using a subtask prompt template; obtaining a first representation of a first web page; creating a first language model prompt using (a) the task prompt template, (b) the instruction text, and (c) the first representation of the first web page; submitting the first language model prompt to a language model to obtain a first language model response including a first next action; selecting the subtask prompt template using the first next action, wherein the subtask prompt template includes a first subtask prompt example of an action performed on a web page; creating a second language model prompt using (a) the subtask prompt template, (b) the first next action, and (c) the first representation of the first web page; submitting the second language model prompt to the language model to obtain a second language model response including a second next action; and implementing the second next action on the first web page to obtain a second web page.

In some aspects, the techniques described herein relate to a computer-implemented method, including determining a natural language intent from the instruction text and wherein the task prompt template is selected using the natural language intent.

In some aspects, the techniques described herein relate to a computer-implemented method, wherein the first task prompt example includes (a) first example instruction text, (b) a first example representation of a first web page, and (c) a first example next action.

In some aspects, the techniques described herein relate to a computer-implemented method, wherein the task prompt template includes a second task prompt example, wherein the second task prompt example includes (a) second example instruction text, (b) a second example representation of a second web page, and (c) a second example next action.

In some aspects, the techniques described herein relate to a computer-implemented method, wherein the task prompt template is selected from a plurality of task prompt templates.

In some aspects, the techniques described herein relate to a computer-implemented method, wherein the first next action indicates an identifier of the subtask prompt template and a first subtask attribute.

In some aspects, the techniques described herein relate to a computer-implemented method, wherein creating the second language model prompt includes using the first subtask attribute.

In some aspects, the techniques described herein relate to a computer-implemented method, wherein the first subtask prompt example includes (a) first example instruction text, (b) a first example representation of a first web page, and (c) a first example next action.

In some aspects, the techniques described herein relate to a system, including at least one server computer including at least one processor and at least one memory, the at least one server computer configured to: receive instruction text including instructions for accomplishing a task on a website; select a task prompt template using the instruction text; obtain a first representation of a first web page; create a first language model prompt using (a) the task prompt template, (b) the instruction text, and (c) the first representation of the first web page; submit the first language model prompt to a language model to obtain a first language model response including a first next action; select a subtask prompt template using the first next action; create a second language model prompt using (a) the subtask prompt template, (b) the first next action, and (c) the first representation of the first web page; submit the second language model prompt to the language model to obtain a second language model response including a second next action; and implement the second next action on the first web page to obtain a second web page.

In some aspects, the techniques described herein relate to a system, wherein the task prompt template includes a first task prompt example of an action implemented using a subtask prompt template.

In some aspects, the techniques described herein relate to a system, wherein the subtask prompt template includes a first subtask prompt example of an action performed on a web page.

In some aspects, the techniques described herein relate to a system, the at least one server computer is configured to: obtain a second representation of the second web page; create a third language model prompt using (a) the subtask prompt template, (b) the first next action, (c) the second representation of the second web page, and (d) the second next action; submit the third language model prompt to the language model to obtain a third language model response including a third next action; and implement the third next action on the second web page to obtain a third web page.

In some aspects, the techniques described herein relate to a system, the at least one server computer is configured to: obtain a third representation of the third web page; create a fourth language model prompt using (a) the task prompt template, (b) the instruction text, (c) the third representation of the third web page; and (d) the first next action; submit the fourth language model prompt to the language model to obtain a fourth language model response including a fourth next action; and implement the fourth next action on the third web page to obtain a fourth web page.

In some aspects, the techniques described herein relate to a system, wherein the subtask prompt template is selected from a plurality of subtask prompt templates.

In some aspects, the techniques described herein relate to a system, wherein the at least one server computer is configured to submit the first language model prompt to a language model by submitting the first language model prompt to a third-party using an API call.

In some aspects, the techniques described herein relate to one or more non-transitory, computer-readable media including computer-executable instructions that, when executed, cause at least one processor to perform actions including: receiving instruction text including instructions for accomplishing a task on a website; selecting a task prompt template using the instruction text, wherein the task prompt template includes a first task prompt example of an action implemented using a subtask prompt template; obtain a first representation of a first web page; creating a first language model prompt using (a) the task prompt template, (b) the instruction text, and (c) the first representation of the first web page; submitting the first language model prompt to a language model to obtain a first language model response including a first next action; selecting the subtask prompt template using the first next action, wherein the subtask prompt template includes a first subtask prompt example of an action performed on a web page; creating a second language model prompt using (a) the subtask prompt template, (b) the first next action, and (c) the first representation of the first web page; submitting the second language model prompt to the language model to obtain a second language model response including a second next action; and implementing the second next action on the first web page to obtain a second web page.

In some aspects, the techniques described herein relate to one or more non-transitory, computer-readable media, wherein the second next action includes clicking an element of the first web page or entering text into an element of the first web page.

In some aspects, the techniques described herein relate to one or more non-transitory, computer-readable media, wherein the instruction text is received from a support session between a customer and an agent.

In some aspects, the techniques described herein relate to one or more non-transitory, computer-readable media, wherein the first representation of the first web page omits one or more HTML elements of the first web page.

In some aspects, the techniques described herein relate to one or more non-transitory, computer-readable media, wherein creating the first language model prompt includes replacing a placeholder in the task prompt template with a value for the placeholder.

BRIEF DESCRIPTION OF THE FIGURES

The invention and the following detailed description of certain embodiments thereof may be understood by reference to the following figures:

FIGS. 4A-C represent an example prompt template to assist a user with a web browsing task.

FIGS. 7A-B represent an example task prompt template to assist a user with a web browsing task.

FIGS. 8A-C represent an example subtask prompt template to be used with a task prompt template to perform a subtask.

Figure 9D:
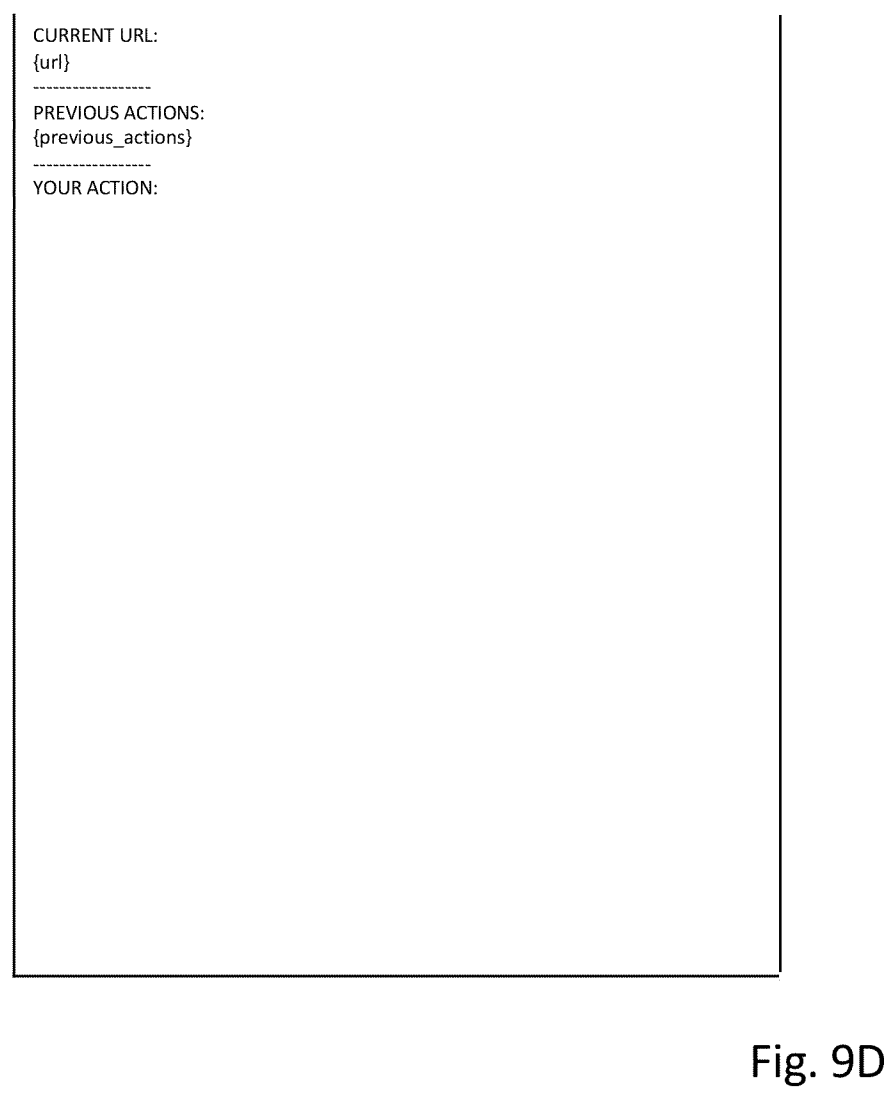

FIGS. 9A-D represent an example subtask prompt template to be used with a task prompt template to perform a subtask.

DETAILED DESCRIPTION

Figure 2:
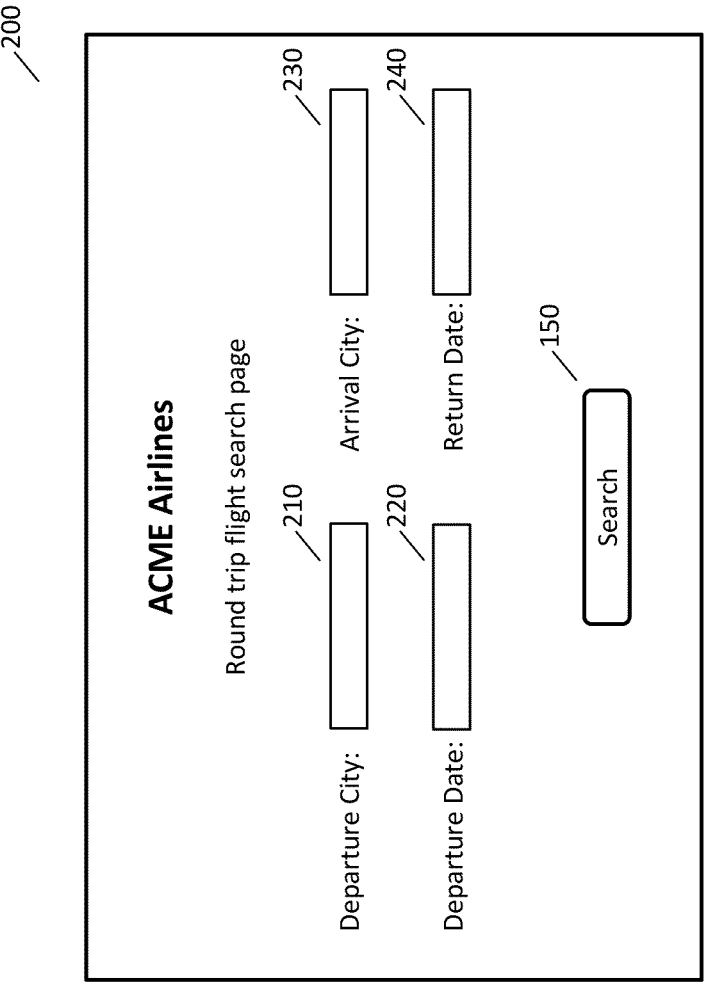
FIG. 2 is an example user interface of a web browser task.

Large language models (LLMs), such as the GPT models created by OpenAI™, have recently provided impressive results for a variety of tasks. A user may submit a text question to an LLM to receive a response or may provide text instructions to an LLM to perform a task. The response of the LLM may appear similar to a response generated by a person or may even perform better than many people on certain tasks. An LLM may be any language model that has a larger number of parameters. The techniques described herein may be performed with any appropriate language model, and a large language model is not required.

A language model is a mathematical model that stores information about natural language, such as patterns, structures, and relationships of natural language. A language model may, for example, be able to determine probabilities, likelihoods, or scores corresponding to sequences of words or sentences or may be able to generate text. For example, a language model may be used for one or more of the following applications: text completion, text generation, language translation, sentiment analysis, or text summarization. A language model may use any appropriate mathematical model, such as a neural network. In some implementations, a language model may use a transformer model architecture. In some implementations, a language model may include sequences of layers, such as one or more of the following layers: an embedding layer, an attention layer, a multi-head attention layer, a feed-forward layer, a normalization layer, a linear layer, or a softmax layer.

Language models may automate many text-processing tasks that are tedious or difficult for a person. Language models may also perform tasks relating to processing text that is different from everyday language, such as computer software or the text of web pages (e.g., web pages written using HTML or hypertext markup language).

It may be desired to instruct a language model to perform a task on a website. For example, instead of a person going through the steps to make a flight reservation, a person could ask the language model to perform those steps. The language model may process the HTML of a web page to determine an action to perform on the web page according to the instructions of a person. The language model may perform such actions until the task is complete.

The text that is submitted to a language model may be referred to as a prompt. Prompt templates may be created to facilitate the generation of prompts. A prompt template may be directed to a task or group of tasks, such as making a flight reservation or, more broadly, making a reservation that includes a start date and an end date (e.g., a car rental). The prompt template may be completed using other information (such as the instructions or request of a user) to generate a prompt that is submitted to a language model. In other examples, a prompt template may be directed to a task or group of tasks that includes making a payment, scheduling a recurring payment, placing an order, and the like.

To assist a language model in performing a requested task correctly, one-shot or few-shot techniques may be applied. A language model may be a general purpose language model and/or provided by a third party. Accordingly, it may not be possible or practical to perform additional training or pre-training to improve the performance of the language model on specific tasks. Instead, information may be provided in the prompt submitted to the language model to help the language model perform the task better.

For example, a prompt may include one or more examples of a sequence of web pages that were used to create a flight reservation and the actions that were performed between the web pages. The language model can use the examples in the prompt to better perform the task for a different reservation (e.g., different locations, a different airline, or a car reservation).

One difficulty with using few-shot learning with prompts is that that prompt may be limited to a maximum size. Providing multiple examples for each step of the process for making a flight reservation on a website (e.g., departure date, departure location, etc.) may cause the prompt to exceed the maximum size. Alternatively, where there is not a maximum size or the maximum size is not exceeded, having too many examples for few-shot learning may impact the performance of the language model.

To improve the ability of a language model to perform complex tasks, such as performing a sequence of actions on a website, the complex task may be broken down into a main task and subtasks. The main task may use a task prompt template to provide higher level guidance for how to complete the task (e.g., first enter the departure date) and the subtask may use a subtask prompt template to indicate how to implement portions of the task (e.g., what web page operations are needed to enter the departure date on a website).

A task template may use few-shot learning to assist the language model determine the next higher level action, and a subtask template may use few-shot learning to assist the language model in implementing the subtask on a web page. Further levels are also possible, such as a subsubtask or even a subsubsubtask. By having prompts for subtasks, a greater number of examples may be provided to help improve the performance of the language model on the subtask.

The techniques described herein are not limited to instructing a language model to perform a task on a website. The techniques described herein may be used to instruct a language model to perform any appropriate task where the task may be broken down into subtasks and subtask prompt templates may be used with few-shot learning to implement portions of the task. For clarity of presentation, the description below will use a flight reservation on a website as an example of a task to be performed by a language model, but the same techniques may be used to implement a variety of tasks, including tasks that are not performed on a website. For example, the techniques described herein may be used to accomplish tasks such as drafting documents or completing PDF forms.

Figure 1:
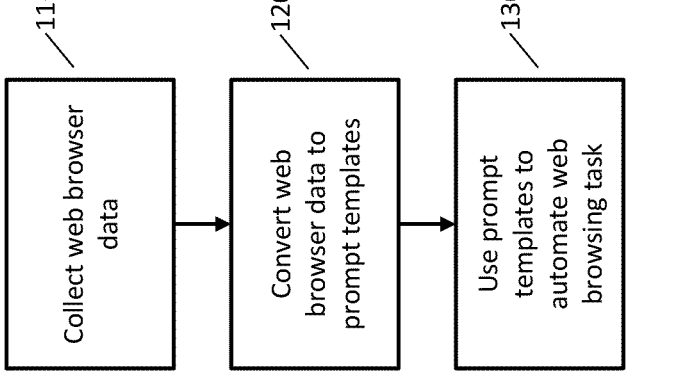
FIG. 1 is a flowchart of an example method for creating and using language model prompt templates for automating a task on a website.

FIG. 1 is a flowchart of an example method for creating and using language model prompt templates for automating a task on a website.

At step 110, web browser data is collected. Any appropriate techniques may be used to collect the web browser data. For example, software may be installed (e.g., a web browser extension) that may be used to save or record a sequence of operations on a website to accomplish a task. For example, a sequence of HTML (hypertext markup language) or DOM (document object model) pages may be stored along with the operations performed between each of the pages. A new page may be stored at any appropriate time, such as after a user-interface operation (e.g., entering text into a text box), a Javascript operation (e.g., Javascript modifies the page), or after a new page is rendered (e.g., in response to submitting a form).

At step 120, the web browser data is processed to create language model prompt templates, such as any of the prompt templates described herein. Any appropriate techniques may be used to generate the prompt templates, and the generation may be performed by a person, performed automatically, or a combination of the two. The prompt templates may include task templates and subtask templates.

At step 130, the prompt templates are used to perform a task on a website. An instruction may be received for a task to be accomplished and a sequence of prompts may be generated from the prompt templates, where the prompts are submitted to a language model and the response of the language model is used to determine the next action to be performed. Any appropriate techniques may be used to implement actions indicated by a language model. For example, the web browser may be controlled by software (e.g., a browser extension) or the actions may be performed by a headless browser.

FIG. 2 is an example user interface 200 of a web browser task. The example of FIG. 2 corresponds to a flight reservation, but the techniques described herein may be used for any appropriate web browser task or tasks not relating to web browsers. In FIG. 2, a person may complete the input fields for the departure city 210, departure date 220, arrival city 230, and return date 240. The user may then click search button 150 to see matching flights. A person may use the user interface 200 to generate web browsing data. Additionally, the actions on user interface 200 may be implemented automatically using actions determined by a language model.

Figure 3:
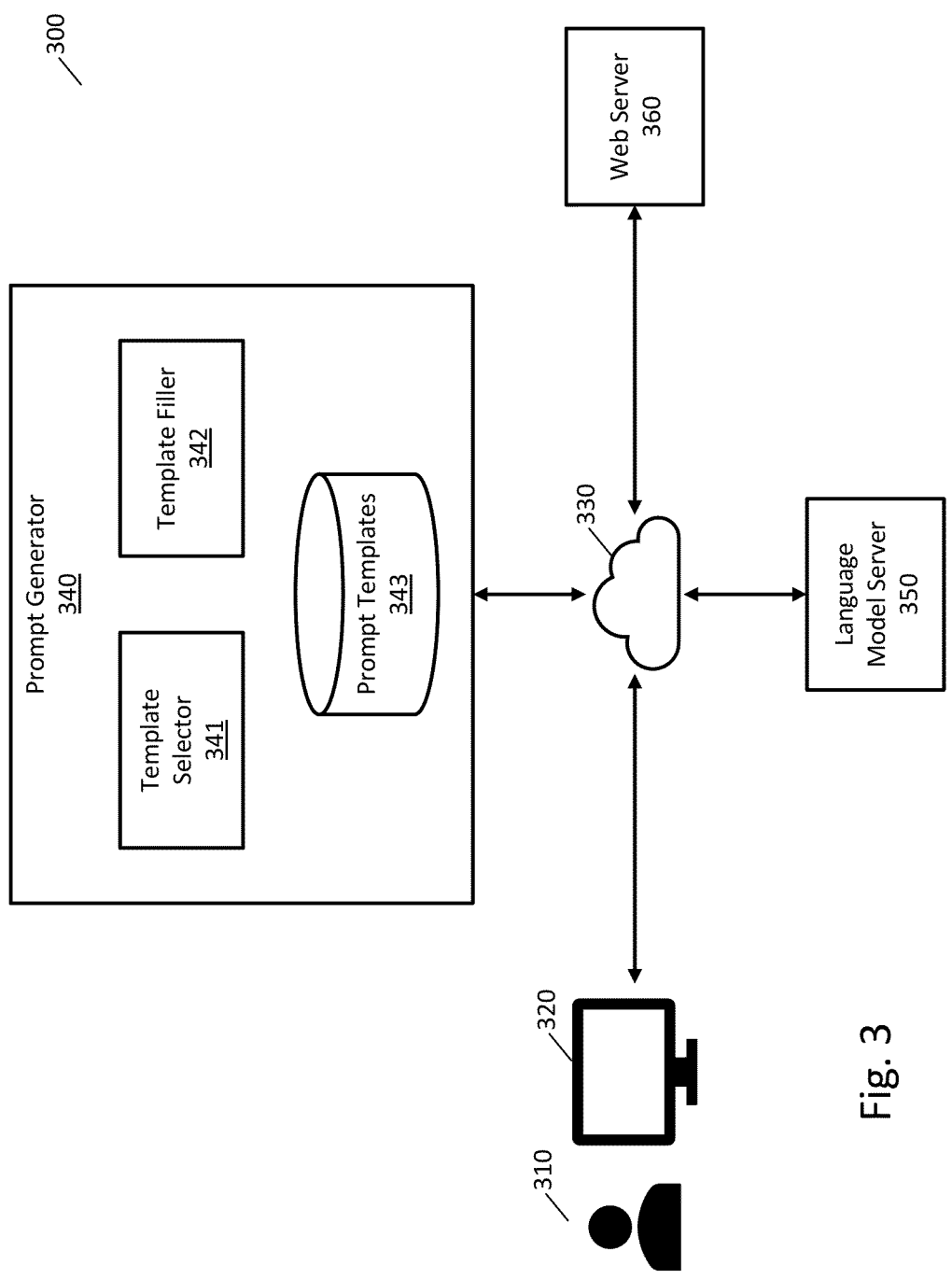
FIG. 3 is an example system for automating a task performed by a web browser.

FIG. 3 is an example system 300 for automating a task performed by a web browser.

In FIG. 3, user 310 may use computer 320 to perform a task using a web browser. Computer 320 may use network 330 to communicate with web server 360. For example, web server 360 may be the web server of an airline, and user 310 may make an airline reservation with computer 320. The actions of user 310 may be recorded and used to generate prompt templates for tasks and/or subtasks.

After the web browsing data is collected and prompt templates are generated, the prompt templates may be used with a language model to automate web browsing tasks. User 310 may provide instructions for task to be performed. The user may provide the instructions using any appropriate techniques, such as typing the instructions or speaking the instructions. In some implementations, user 310 may be communicating with another user (not shown), such as a customer support agent, and the instructions may be determined from the conversation between the users. Note that the user who is using the prompt templates to automate a task may be different from the user whose web browsing session was recorded. After prompt templates are created, they may be used with any user and need not be specific to a particular user.

In some cases, when available, prompt templates may be generated from webpage flow specifications or flow diagrams. Webpage flow specifications may be any data that provide specifications for data entry requirements for each page and/or the user actions necessary to accomplish a task on a page or a series of pages.

The web browsing task may be automated using prompt generator 340. Prompt generator may receive inputs (e.g., instructions from a user and a web page) and generate a prompt to be submitted to a language model to obtain an action to be performed on a web page. Prompt generator 340 may be a service provided by a company and may be accessed using any appropriate techniques. In some implementations, prompt generator 340 may be accessed via an API call from computer 320 over network 330. In some implementations, prompt generator 340 may be software that is installed on computer 320.

Prompt generator 340 may have a prompt templates data store 343 that may contain any appropriate prompt templates, such as task prompt templates and subtask prompt templates. Prompt generator 340 may have template selector component 341 that may process inputs (e.g., instructions from a user and a web page) to select a prompt template from prompt templates data store 343 to be used to generate a prompt. Prompt generator 340 may have a template filler component 342 that may be used to generate a prompt from a prompt template and input data.

The generated prompt may then be submitted to a language model. The prompt may be submitted to a language model using any appropriate techniques. In some implementations, prompt generator 340 may submit the prompt to a language model to obtain the response of the language model. In some implementations, prompt generator 340 may provide the prompt to another actor (e.g., computer 320) where the other actor submits the prompt to the language model.

Language model server 350 may receive a prompt and return a response generated by a language model. Language model server 350 may use any appropriate language model, such as a GPT language model. Language model server 350 may be a service provided by a company and may be accessed using any appropriate techniques. In some implementations, language model server 350 may be accessed via an API call from computer 320 over network 330. In some implementations, language model server 350 may be software that is installed on computer 320. Language model server 350 may be implemented by a company and may be the same as or different from the company who operates prompt generator 340. The response of the language model may include any appropriate text, such as one or more of the following: text to be presented to a user; an operation to be performed on a web page (e.g., entering text into a field or clicking a button); or an indication to perform other actions with the language model, such as using a sub-task prompt template.

The response of the language model may be received at computer 320 and processed to assist user 310 with a task.

In some instances, the response of the language model may be processed to cause computer 320 to submit data to web server 360, such as submitting a form with an HTTP POST or clicking a button to get a new page with an HTTP GET. For example, as described in greater detail below, the response of the language model may indicate a portion of a web page (e.g., an element) and an operation to be performed on that element (e.g., a click or entering text).

FIGS. 4A-C represent an example prompt template 400 to assist a user with a web browsing task. Prompt template 400 may be stored in any appropriate location, such as in a text file or in a database (e.g., prompt templates data store 343). Prompt template 400 may be used to generate a prompt that may be submitted to a language model.

A language model understands language as used by people. Accordingly, a prompt to a language model may provide instructions to the language model that are similar to instructions that one might provide to a person. A prompt template may have different sections to provide different types of instructions to the language model. The following are example prompt template sections that may be included in a prompt template.

Prompt template 400 may have general instructions 410 that provide high-level information about the task to be completed. In prompt template 400, the general instructions 410 relate to performing operations on a web page using the following information: instruction text corresponding to a desired task to be performed (which may be referred to as a context of the task); a URL of a current web page; a representation of the HTML or DOM of the web page (e.g., a simplified version of the web page); and/or operations that the language model may specify in its response (e.g., clicking on a button or entering text).

Prompt template 400 may have an example format 420 that may be used to provide examples to the language model. The example format 420 may assist the language model in understanding provided examples of how to implement tasks using a web browser.

Prompt template 400 may have one or more examples of how to accomplish tasks given a web page and a desired outcome. These examples may be referred to as using one-shot or few-shot learning to assist the language model in understanding how to accomplish a task. The language model may understand how natural language is used but the training data for the language model may not have included examples of providing actions to accomplish a task on a web page. The provided examples may help fill in the gaps of the knowledge of the language model and allow the language model to better perform a requested task.

First prompt example 430, second prompt example 440, third prompt example 450, fourth prompt example 460, and fifth prompt example 470 provide examples of how to perform a task using a web browser. Each example may include one or more of an example URL, an example context (e.g., example instruction text), an example representation of a web page, example previous actions that were taken, and an example next action to take to accomplish the task.

Task specification 480 instructs the language model of the desired task to be accomplished. This section of the template includes variables or placeholders to be filled according to a current task to be accomplished. For example, {context} may be replaced by instruction text of the desired task, {url} may be replaced by the URL of a current web page, {browser_content} may be replaced by a representation of a current web page, and {previous_actions} may be replaced be zero or more actions already performed to complete the desired task.

Prompt template 400 is just one example of a prompt template that may be used to instruct a language model to complete a task and many variations are possible. Portions of the prompt template 400 may be omitted and other text may be added. Templates may include text and data in a variety of formats that may include different data organization, formatting, encoding, placeholder identification characters, and the like. Any suitable template format may be used.

Figure 5:
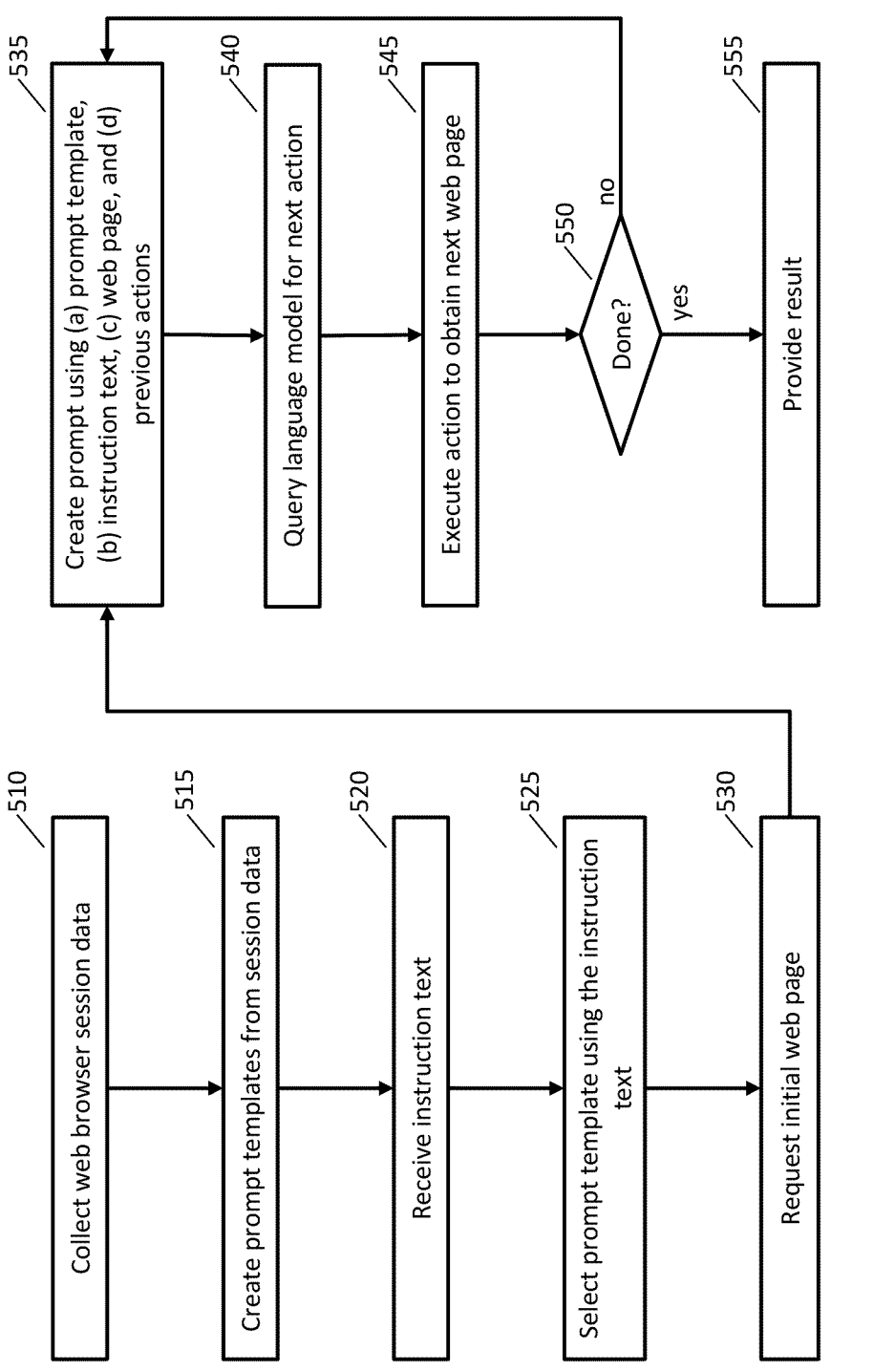
FIG. 5 is a flowchart of an example method for instructing a language model to perform a task using a web browser.

FIG. 5 is a flowchart of an example method for instructing a language model to perform a task using a web browser.

At step 510, web browser session data is collected. Any appropriate web browser session data may be collected using any appropriate techniques, such as using any of the techniques described herein. For example, a browser extension may be installed to record web browsing sessions of users. The web browser session data may include sequences of representations of web pages (e.g., HTML or DOM) and actions performed between the web pages (e.g., entering text into a specific element for clicking a specific element with a mouse).

At step 515, prompt templates are created from the browser session data. Any number of prompt templates may be created. In some implementations, a prompt template may be created from a single web browser session (e.g., a single sequence of web pages and corresponding actions). In some implementations, a prompt template may be created from two or more browser sessions. The prompt templates may be created using any appropriate techniques, and may be created manually, using automated processes, or a combination of manual and automated processes.

A prompt template may include one or more examples of operations performed during a web browser session. The examples may be presented using any appropriate techniques, such as in the example prompt template of FIGS. 4A-C or any of the other examples described herein. The examples in a prompt template may include any appropriate representation of a web page from a web browser session. In some implementations, a representation of a web page may be a simplified representation of HTML or DOM where some portions of the web page are removed (e.g., headers, footers, or other elements or attributes not needed for accomplishing the task of the web browser session).

At step 520, instruction text is received for accomplishing a task. Any appropriate instruction text may be received. In some implementations, the instruction text may be from a customer support session between a customer and an agent. In some implementations, the instruction text may be received from a user who would like to automate completion of a web browsing task.

At step 525, a prompt template is selected using the instruction text. The prompt template may be selected using any appropriate techniques. In some implementations, the instruction text may be processed with a classifier to select a natural language intent from a set of possible natural language intents. Prompt templates may be associated with a natural language intent, and a prompt template may be selected by selecting a prompt template whose intent matches the intent of the instruction text.

At step 530, an initial web page is be requested. The initial web page may be requested using any appropriate techniques. For example, the initial web page may be determined from the prompt template or may be provided by a user.

In some implementations, the initial web page may be requested using a web browser plugin or extension. For example, a web browser (e.g., Chrome, Firefox, or Safari) may allow users to install plugins or extensions that allow software (e.g., JavaScript) to control the web browser, perform actions on a web page, or obtain data relating to web pages shown in the browser.

In some implementations, the initial web page may be selected using a headless browser, such as Puppeteer or Selenium. A headless browser may be a browser without a graphical user interface. A headless browser may request web pages, process JavaScript, and perform HTTP requests in a similar manner as web browsers with a graphical user interface.

At step 535, a prompt is created or generated using the selected prompt template, the instruction text, a representation of a web page (e.g., a representation of the initial web page for the first iteration of step 535), and information about previous actions performed during the automation process (which may be empty for a first iteration of step 535). The prompt may be created using any appropriate techniques, such as any of the techniques described herein.

At step 540, a query is submitted to a language model using the prompt to obtain a response from the language model. The query may be submitted using any appropriate techniques, such as any of the techniques described herein. In some implementations, the prompt may be submitted to third-party language model using an API call. The response of the language model may indicate an action to be performed, such as an operation to be performed on a web page (e.g., clicking an element with a mouse or entering text).

At step 545, the web page operation indicated by the next action of the response of the language model is implemented or executed to obtain a next web page. The web page operation may be executed using any appropriate techniques. The next web page may or may not require an HTTP request. For example, when the web page operation is to enter text, the web page may be updated by entering text into an input element, but an HTTP request (e.g., a GET or a POST) may not be performed. For another example, the web page operation may be to click a button to submit a form and the execution of the action may cause an HTTP request to be performed.

In some implementations, the next action of the response of the language model may be implemented using a web browser extension or plugin or using a headless browser. The next action may indicate an element or portion of a web page, such as indicated by element attributes (e.g., a class or identifier) or any other appropriate techniques (e.g., XPath syntax). The next action may also indicate an action to be performed, such as a click or entering text into an input element.

At step 550, it is determined if the task specified by the instruction text is complete. Any appropriate techniques may be used to determine if the task is complete. In some instances or implementations, the response of the language model may indicate that the task is complete (e.g., a next action of DONE). In some instances or implementations, the content of the next web page may indicate that the task is complete.

If the task is complete, then processing proceeds to step 555, where a result is provided to a user. A result may be provided to the user using any appropriate techniques. In some implementations, a final web page may be presented to the user. In some implementations, a description of the completed task may be presented to the user.

If the task is not complete, then processing proceeds to step 535 to repeat the process of creating a prompt, querying the language model using the prompt to obtain a language model response, and then implementing an action corresponding to the language model response. For iterations after the first, the prompt may be created using the most recent web page and the previously performed actions. Steps 535 to 550 may be repeated any number of times until the task indicated by the instruction text is complete.

In some implementations, it may be desired to modify the above techniques to allow a task to be broken down into subtasks. A language model may be used to select a sequence of subtasks to be performed. The same language model or maybe a different language model may be used to implement the subtasks. More than two levels are possible, such as breaking up a subtask into subsubtasks, and so forth. Breaking a task into subtasks may be desired for a variety of reasons, such as any of the reasons described herein.

Figure 6:
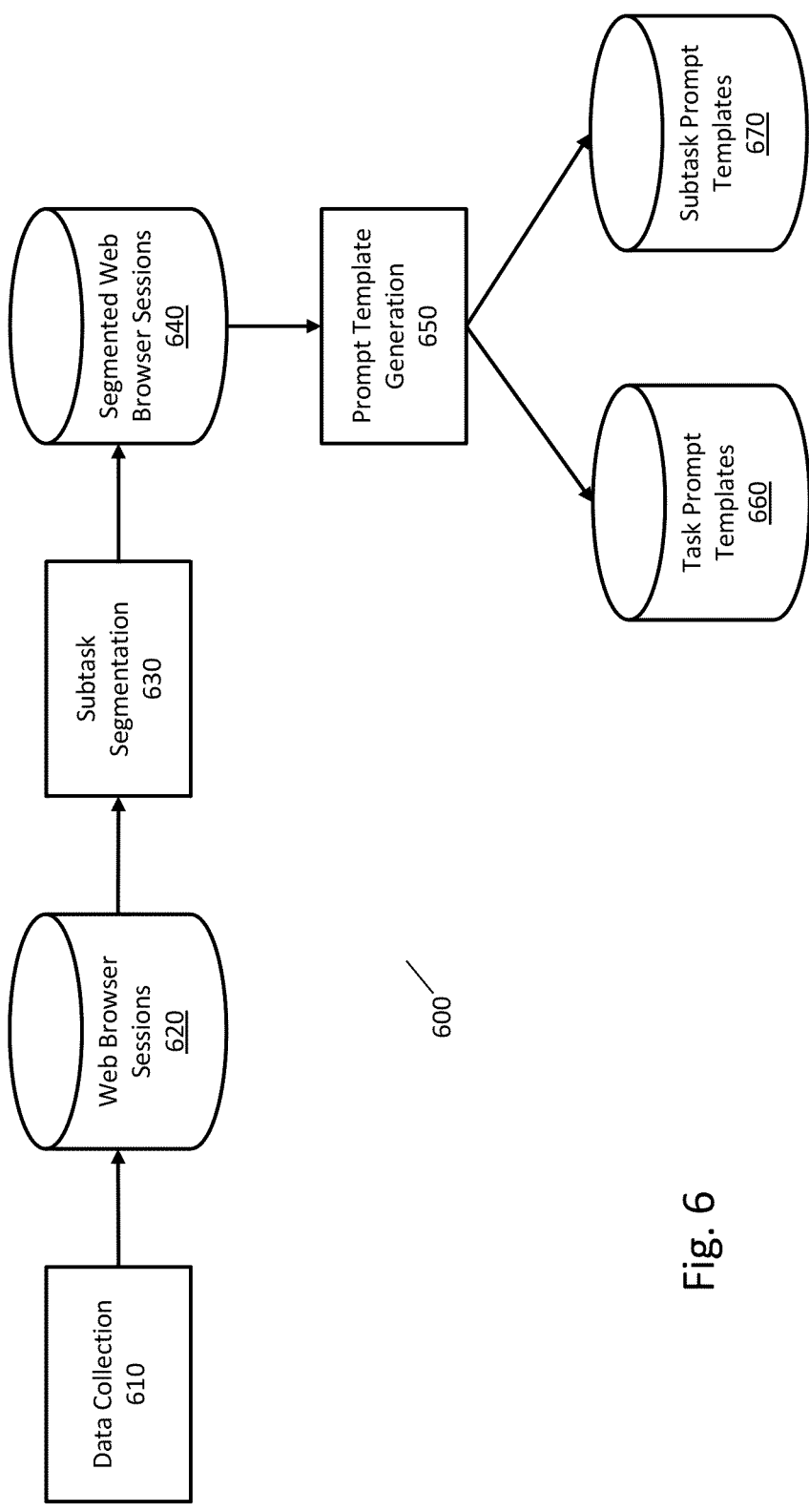
FIG. 6 is an example system for generating task prompt templates and subtask prompt templates from web browser session data.

FIG. 6 is an example system 600 for generating task prompt templates and subtask prompt templates from web browser session data. The processing of system 600 may be performed automatically, manually, or a combination of automatically and manually.

In FIG. 6, data collection component 610 may collect web browser session data, using any appropriate techniques, such as any of the techniques described herein. The web browser session data may be stored in any appropriate format, such as a sequence of web pages and corresponding actions. The output of data collection component 610 may be stored in web browser sessions data store 620.

Subtask segmentation component 630 may process the web browser session data from web browser sessions data store 620 to generate segmented web browser session data. The web browser session data may be segmented using any appropriate techniques. The segmented web browser session data may be stored in segmented web browser sessions data store 640.

In some implementations, segmenting web browser session data may include grouping a sequence of one or more actions into a segment. For example, suppose a web browser session is represented as:

P1→a1→P2→a2→P3→a3→P4→a5→P6→a6→P7 where P1 to P7 correspond to web pages and a1 to a6 correspond to actions between web pages. It may be determined that this web browser session has three segments: a first segment may correspond to actions a1 to a3, a second segment may correspond to action a4, and a third segment may correspond to actions a5 and a6.

The actions of a segment may correspond to a subtask. For example, the first segment with actions a1 to a3 may correspond to entering a departure date for a flight. The second segment with action a4 may correspond to clicking a next button to proceed to the next portion of the reservation. The third segment with actions a5 and a6 may correspond to entering a return date for the flight.

Prompt template generation component 650 may process segmented web browser session data from segmented web browser sessions data store 640 to generate task prompt templates and subtask prompt templates. The task and subtask prompt templates may be generated in a similar manner as other prompt templates described herein. Examples of task and subtask prompt templates are described in greater detail below.

A task prompt template may be constructed to focus on higher level parts of a task. In some implementations, a task prompt template may instruct a language model to select a subtask as a next action to be performed. In some implementations, a task prompt template may instruct a language model to provide a sequence of subtasks to be performed to complete the task. In some implementations, a task prompt template may only allow a language model to select from a list of possible subtasks. In some implementations, a task prompt template may allow a language model to select from a list of possible subtasks or from a list of possible web page operations to be performed on a web page (e.g., a click or entering text).

A subtask prompt template may be constructed to instruct the language model to select web page operations to be performed on a web page (e.g., a click or entering text) to complete the subtask. The subtask prompt template may be similar to prompt template 400 where the subtask prompt template is directed to a subtask, such as entering a date on a web page.

A task prompt template may be created with data from a single web browsing session or with data from more than one web browsing session. Similarly, a subtask prompt template may be created with data from a single web browsing session or with data from more than one web browsing session.

Where a subtask prompt template is created from more than one web browsing session, the subtask prompt template may perform the subtask with greater accuracy. For example, consider a subtask prompt template for entering a date on a web page. Where a subtask prompt template is created from a single web browser session, it may perform the correct actions for similar web pages, but it may perform incorrect actions for other web pages. Where a subtask prompt template is created from more than one web browser session (and possibly corresponding to different websites), the subtask prompt template may have greater knowledge and be more likely to perform the subtask correctly on a greater number of web pages.

Prompt template generation component 650 may store the generated task prompt templates in task prompt templates data store 660 and may store the generated subtask prompt templates in subtask prompt templates data store 670.

FIGS. 7A-B represent an example task prompt template 700 to assist a user with a web browsing task. Task prompt template 700 may be stored in any appropriate location, such as in a text file or in a database (e.g., prompt templates data store 343 or task prompt templates data store 660). Task prompt template 700 may be used to generate a prompt that may be submitted to a language model.

Task prompt template 700 may have similar sections as other prompt templates described herein. For example, task prompt template 700 may have general instructions 710 that provide high-level information about the task to be completed; a first task prompt example 720; a second task prompt example 730; and a task specification 740.

General instructions 710 may provide instructions to the language model to select among available subtasks to perform. For example, the available subtasks may include FILL_TEXT, CHOOSE_DATE, CLICK, and DONE. General instructions 710 may relate to selecting a single next subtask to be performed or to selecting a sequence of subtasks to be performed to complete the task.

First task prompt example 720 and second task prompt example 730 may provide examples of a context (e.g., instruction text), a representation of a web page, and a next subtask to be performed or a list of subtasks to be performed to complete the task.

A subtask may be specified using any appropriate techniques. In some implementations, a subtask may be specified with one or more of a subtask ID (e.g., FILL_TEXT, CHOOSE_DATE, CLICK, or DONE); a subtask attribute that provides additional information about where or how the subtask is to be performed (e.g., for a CHOOSE_DATE subtask, the attribute may indicate whether the chosen date should relate to a departure date or a return date); or a subtask value (e.g., the desired departure or return date corresponding to the instruction text).

Task specification 740 instructs the language model of the desired task to be accomplished, and may be implemented in a similar manner as for task specification 480.

FIGS. 8A-C represent an example subtask prompt template 800 to be used with a task prompt template to perform the subtask FILL_TEXT. Subtask prompt template 800 may be stored in any appropriate location, such as in a text file or in a database (e.g., prompt templates data store 343 or subtask prompt templates data store 670). Subtask prompt template 800 may be used to generate a prompt that may be submitted to a language model.

Subtask prompt template 800 may have similar sections as other prompt templates described herein. For example, subtask prompt template 800 may have general instructions 810 that provide high-level information about the subtask to be completed; subtask prompt examples 820, 830, 840, 850, and 860; and a subtask specification 870.

While a task prompt template instructs a language model to select a subtask, a subtask prompt template may instruct a language model to perform operations on a web page, such as typing text into an input element. Accordingly, the subtask prompt examples may be examples of completing the subtask using web page operations. The CONTEXT or instruction text of the subtask prompt examples may be a specification of the subtask to be completed. The YOUR ACTION of the subtask prompt example may be the next web page operation to be performed to complete the subtask.

Similarly, for the subtask specification 870, the CONTEXT or instruction text to be inserted into the template may be the subtask selected when using a task prompt template, such as task prompt template 700. For example, where a response to a prompt generated with task prompt template 700 indicates that the next subtask to be performed is "FILL_TEXT flight-to Paris," this subtask description may be inserted into the {context} placeholder of subtask specification 870.

FIGS. 9A-D represent an example subtask prompt template 900 to be used with a task prompt template to perform the subtask CHOOSE_DATE. Subtask prompt template 900 may be similar to subtask prompt template 800 except that it is designed for completing a different subtask. Subtask prompt template 900 may have similar sections as other prompt templates described herein. For example, subtask prompt template 900 may have general instructions 910 that provide high-level information about the subtask to be completed; subtask prompt examples 920, 930, 940, 950, and 960; and a subtask specification 970.

Any number of subtask prompt templates may be created for completing different subtasks that may be part of completing a task.

Figure 10:
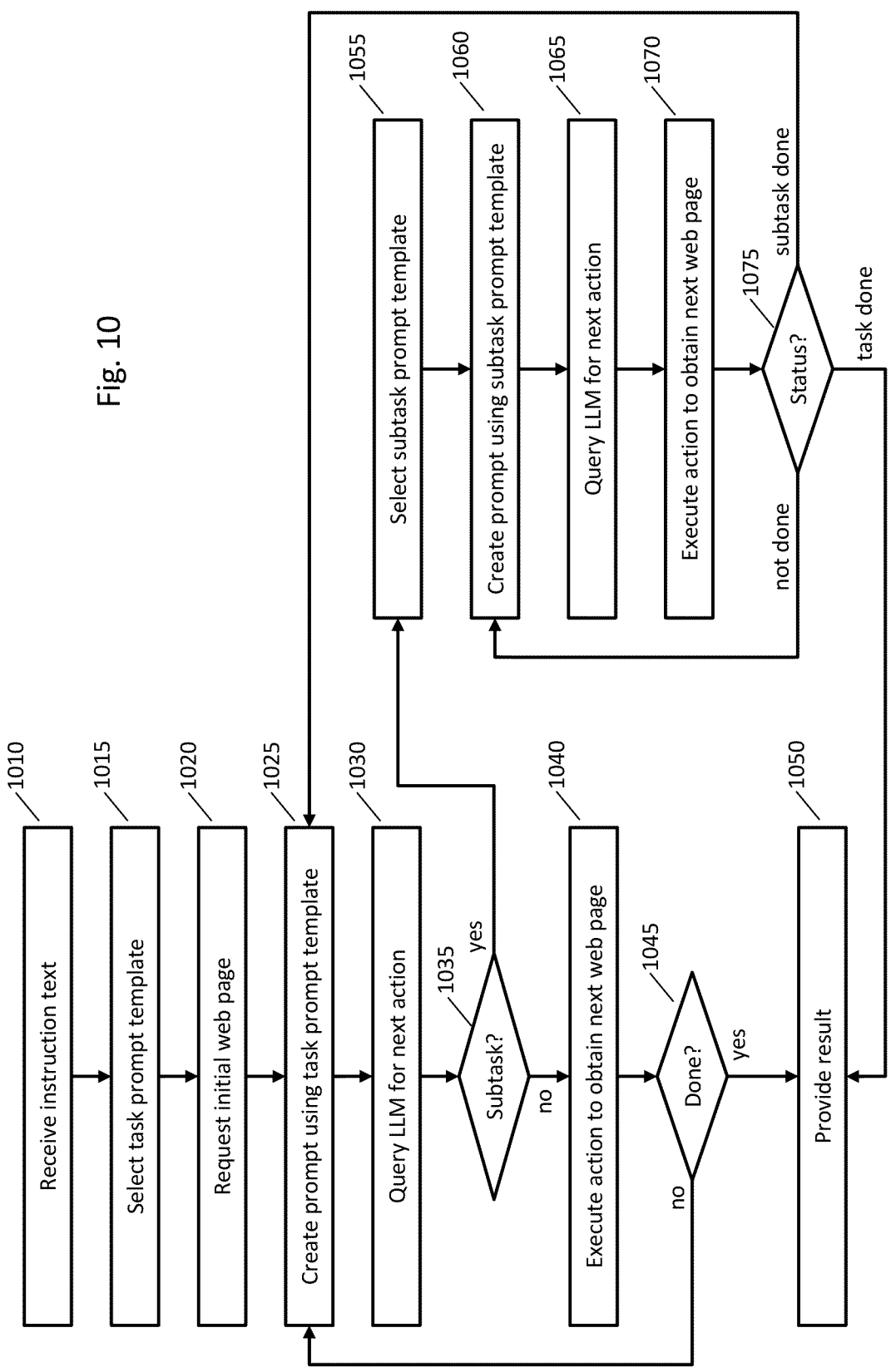
FIG. 10 is a flowchart of an example method for instructing a language model to perform a task using a task prompt template and subtask prompt templates.

FIG. 10 is a flowchart of an example method for instructing a language model to perform a task using a task prompt template and subtask prompt templates.

At step 1010, instruction text is received for accomplishing a task. Step 1010 may be performed as described for step 520. At step 1015, a task prompt template is selected using the instruction text. The task prompt template may include one or more task prompt examples as described herein. Step 1015 may be performed as described for step 525. At step 1020, an initial web page is be requested. Step 1020 may be performed as described for step 530.

At step 1025, a prompt is created or generated using the selected task prompt template, the instruction text, a representation of a web page (e.g., a representation of the initial web page for the first iteration of step 1025), and information about previous actions performed during the automation process (which may be empty for a first iteration of step 1025). The prompt may be created using any appropriate techniques, such as any of the techniques described herein.

The generated prompt may instruct the language model to select a subtask as a next action to accomplish the task specified in the instruction text, where the subtask is associated with subtask prompt template. The generated prompt may also include one or more examples of selecting a subtask given information such as one or more of example instruction test (e.g., example context), an example representation of a web page, example previous actions, and an example next action.

In some implementations, the generated prompt may allow the language model to select among different types of next actions. For example, the possible next action may be a subtask selected from available subtasks or a web page operation selected from available web page operations. In some implementations, the possible next action may only be a subtask selected from available subtasks.

At step 1030, a query is submitted to a language model using the prompt to obtain a response from the language model. Step 1030 may be performed as described for step 530.

At step 1035, it is determined if the response of the language model indicates a next action that corresponds to a subtask. If the next action corresponds to a subtask, then processing proceeds to step 1055. If the next action does not correspond to a subtask (e.g., the next action corresponds to a web page operation), then processing proceeds to step 1040. In some implementations, the next action indicated by the language model may always correspond to a subtask and step 1035 may be omitted. In such instances, step 1055 always follows step 1030. In some implementations, the next action indicated by the language model may correspond to a subtask or a web page operation and step 1035 determines the appropriate subsequent processing.

Step 1035 may be implemented using any appropriate techniques. For example, where the next action includes a name or identifier of a subtask, it may be determined that the next action is a subtask. For another example, where the next action indicates an operation that may be performed on a web page, it may be determined that the next action is not a subtask.

At step 1040, the web page operation indicated by the next action of the response of the language model is implemented or executed to obtain a next web page. Step 1040 may be performed as described for step 545.

At step 1045, it is determined if the task specified by the instruction text is complete. Step 1045 may be performed as described for step 550. If the task is complete, then process proceeds to step 1050, where a result is provided to a user. Step 1050 may be performed as described for step 555. If the task is not complete, then processing proceeds to step 1025 to generate a new prompt using the task template.

Returning to step 1035, where it is determined that the next action corresponds to a subtask, then processing proceeds to step 1055.

At step 1055, a subtask prompt template is selected using the subtask specified by the language model at step 1030. The subtask prompt template may be selected using any appropriate techniques. In some implementations, the subtask specified by the language model may include a subtask ID, and the subtask prompt template may be selected using the subtask ID, such as by retrieving the subtask prompt template from a data store using the subtask ID.

The subtask prompt template may provide instructions to the language model to provide next action to complete the subtask. The subtask prompt template may include one or more subtask prompt examples as described herein. For example, the next action may be a web page operation. Any appropriate subtask prompt template may be used, such as any of the subtask prompt templates described herein.

At step 1060, a prompt is created or generated using the selected subtask prompt template, the subtask (e.g., one or more of a subtask ID, a subtask attribute, or a subtask value), a representation of a web page, and information about previous actions performed during the automation process (which may be empty for a first iteration of step 1060). The prompt may be created using any appropriate techniques, such as any of the techniques described herein.

At step 1065, a query is submitted to a language model using the prompt to obtain a response from the language model. Step 1065 may be performed as described for step 530 or step 1030.

At step 1070, the web page operation indicated by the next action of the response of the language model is implemented or executed to obtain a next web page. Step 1070 may be performed as described for step 545 or step 1040.

At step 1075, a status of the task processing is determined. Any appropriate techniques may be used to determine the status of task processing. In some instances or implementations, the response of the language model may indicate the status of the task processing. In some instances or implementations, the content of the next web page may indicate the status of the task processing.

A status of the task processing may be that the subtask is not done or complete. Where the subtask is not done, processing proceeds to step 1060 to create a prompt using the subtask prompt template. A status of the task processing may be that the subtask is done, but that the overall task is not done. Where the subtask is done but the task is not done, then processing proceeds to step 1025 to generate a prompt using the task prompt template. A status of the task processing may be that the task is done. Where the task is done, then processing proceeds to step 1050 to provide a result to a user.

Variations of the above processing are possible. In some implementations, the response of the language model at step 1030 may indicate a sequence of next actions to be performed instead of a single next action to be performed. Where the response of the language model indicates that a sequence of next actions is to be performed, step 1035, step 1040, and steps 1055-1075 may be iteratively performed on the sequence of next actions. Similarly, the response of the language model at step 1065 may indicate a sequence of next actions to be performed instead of a single next action to be performed. Where the response of the language model indicates that a sequence of next actions is to be performed, step 1070 may be iteratively performed on the sequence of next actions.

Figure 11:
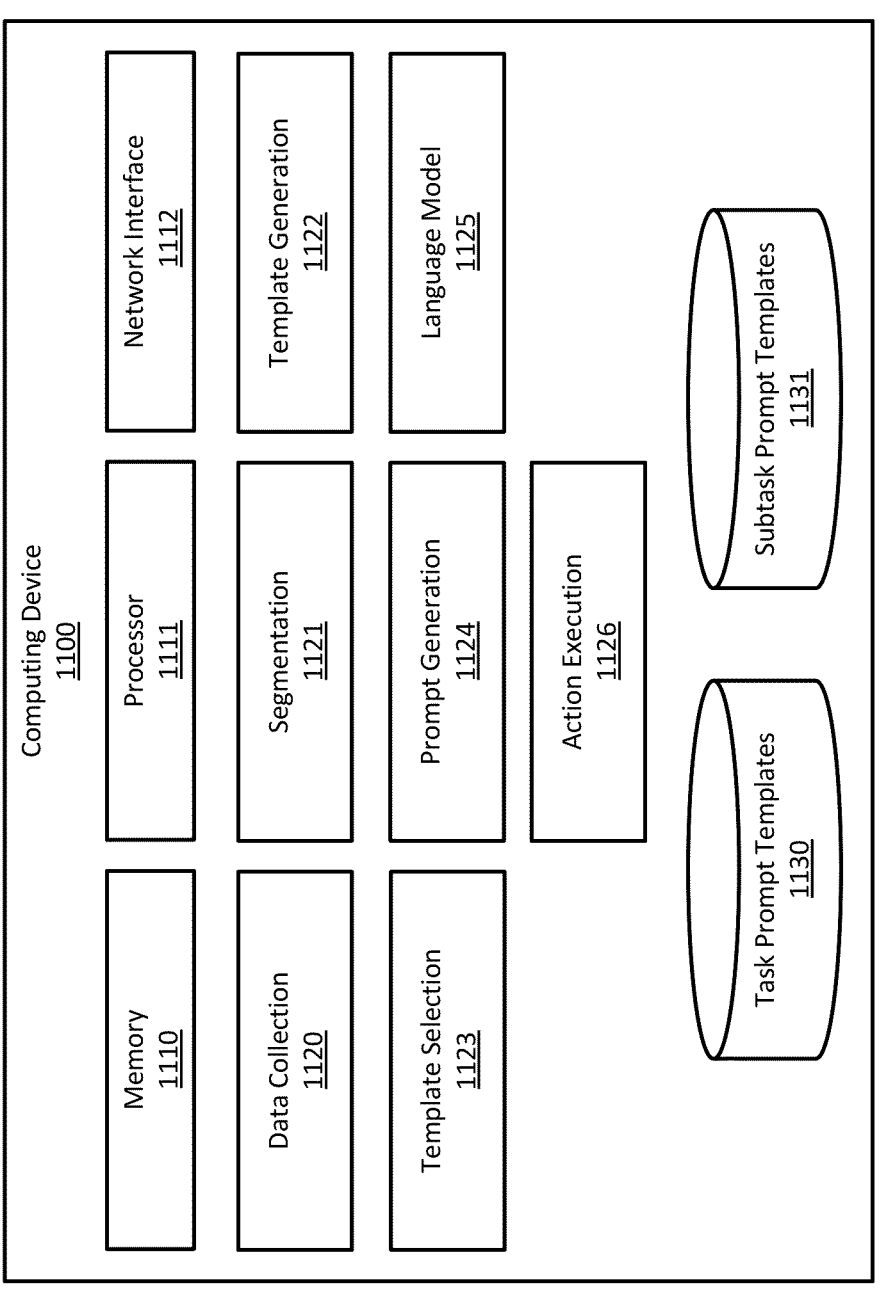
FIG. 11 illustrates components of one implementation of a computing device for implementing any of the techniques described herein.

FIG. 11 illustrates components of one implementation of a computing device 1100 for implementing any of the techniques described herein. In FIG. 11, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1100 may include any components typical of a computing device, such as volatile or nonvolatile memory 1110, one or more processors 1111, and one or more network interfaces 1112. Computing device 1100 may also include any input and output components, such as displays, keyboards, and touch screens. Computing device 1100 may also include a variety of components or modules providing specific functionality, and these components or modules may be implemented in software, hardware, or a combination thereof. Computing device 1100 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 1100 may have a data collection component 1120 that may collect web browser data using any of the techniques described herein. Computing device 1100 may have a segmentation component 1121 that may segment web browser data into segments or subtasks using any of the techniques described herein. Computing device 1100 may have a template generation component 1122 that may generate task or subtask prompt templates using any of the techniques described herein. Computing device 1100 may have a template selection component 1123 that may select a template for specified instruction text using any of the techniques described herein. Computing device 1100 may have a prompt generation component 1124 that may generate a prompt from a prompt template and other data using any of the techniques described herein. Computing device 1100 may have a language model component 1125 that may submit a prompt to a language model or process a prompt with a language model using any of the techniques described herein. Computing device 1100 may have an action execution component 1126 that may implement an action specified by a language model (e.g., a subtask or a web page operation) using any of the techniques described herein.

Computing device 1100 may include or have access to various data stores. Data stores may use any known storage technology such as files, relational databases, non-relational databases, or any non-transitory computer-readable media. Computing device 1100 may have task prompt templates data store 1130 that stores task prompt templates that may be used for automating tasks. Computing device 1100 may have a subtask prompt template data store 1131 that may be used for automating subtasks.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method, comprising:
receiving instruction text comprising instructions for accomplishing a task on a website;
selecting a task prompt template using the instruction text, wherein the task prompt template comprises a first task prompt example of an action implemented using a subtask prompt template;
obtaining a first representation of a first web page;
creating a first language model prompt using (a) the task prompt template, (b) the instruction text, and (c) the first representation of the first web page;
submitting the first language model prompt to a language model to obtain a first language model response comprising a first next action;

selecting the subtask prompt template using the first next action, wherein the subtask prompt template comprises a first subtask prompt example of an action performed on a web page;

creating a second language model prompt using (a) the subtask prompt template, (b) the first next action, and (c) the first representation of the first web page;

submitting the second language model prompt to the language model to obtain a second language model response comprising a second next action; and implementing the second next action on the first web page to obtain a second web page.

2. The computer-implemented method of claim 1, comprising determining a natural language intent from the instruction text and wherein the task prompt template is selected using the natural language intent.

3. The computer-implemented method of claim 1, wherein the first task prompt example comprises (a) first example instruction text, (b) a first example representation of a first web page, and (c) a first example next action.

4. The computer-implemented method of claim 3, wherein the task prompt template comprises a second task prompt example, wherein the second task prompt example comprises (a) second example instruction text, (b) a second example representation of a second web page, and (c) a second example next action.

5. The computer-implemented method of claim 1, wherein the task prompt template is selected from a plurality of task prompt templates.

6. The computer-implemented method of claim 1, wherein the first next action indicates an identifier of the subtask prompt template and a first subtask attribute.

7. The computer-implemented method of claim 6, wherein creating the second language model prompt comprises using the first subtask attribute.

8. The computer-implemented method of claim 1, wherein the first subtask prompt example comprises (a) first example instruction text, (b) a first example representation of a first web page, and (c) a first example next action.

9. A system, comprising at least one server computer comprising at least one processor and at least one memory, the at least one server computer configured to:

receive instruction text comprising instructions for accomplishing a task on a website;

select a task prompt template using the instruction text;

obtain a first representation of a first web page;

create a first language model prompt using (a) the task prompt template, (b) the instruction text, and (c) the first representation of the first web page;

submit the first language model prompt to a language model to obtain a first language model response comprising a first next action;

select a subtask prompt template using the first next action;

create a second language model prompt using (a) the subtask prompt template, (b) the first next action, and (c) the first representation of the first web page;

submit the second language model prompt to the language model to obtain a second language model response comprising a second next action; and implement the second next action on the first web page to obtain a second web page.

10. The system of claim 9, wherein the task prompt template comprises a first task prompt example of an action implemented using a subtask prompt template.

11. The system of claim 9, wherein the subtask prompt template comprises a first subtask prompt example of an action performed on a web page.

12. The system of claim 9, the at least one server computer is configured to:

obtain a second representation of the second web page;

create a third language model prompt using (a) the subtask prompt template, (b) the first next action, (c) the second representation of the second web page, and (d) the second next action;

submit the third language model prompt to the language model to obtain a third language model response comprising a third next action; and implement the third next action on the second web page to obtain a third web page.

13. The system of claim 12, the at least one server computer is configured to:

obtain a third representation of the third web page;

create a fourth language model prompt using (a) the task prompt template, (b) the instruction text, (c) the third representation of the third web page; and (d) the first next action;

submit the fourth language model prompt to the language model to obtain a fourth language model response comprising a fourth next action; and implement the fourth next action on the third web page to obtain a fourth web page.

14. The system of claim 9, wherein the subtask prompt template is selected from a plurality of subtask prompt templates.

15. The system of claim 9, wherein the at least one server computer is configured to submit the first language model prompt to a language model by submitting the first language model prompt to a third-party using an API call.

16. One or more non-transitory, computer-readable media comprising computer-executable instructions that, when executed, cause at least one processor to perform actions comprising:

receiving instruction text comprising instructions for accomplishing a task on a website;

selecting a task prompt template using the instruction text, wherein the task prompt template comprises a first task prompt example of an action implemented using a subtask prompt template;

obtain a first representation of a first web page;

creating a first language model prompt using (a) the task prompt template, (b) the instruction text, and (c) the first representation of the first web page;

submitting the first language model prompt to a language model to obtain a first language model response comprising a first next action;

selecting the subtask prompt template using the first next action, wherein the subtask prompt template comprises a first subtask prompt example of an action performed on a web page;

creating a second language model prompt using (a) the subtask prompt template, (b) the first next action, and (c) the first representation of the first web page;

submitting the second language model prompt to the language model to obtain a second language model response comprising a second next action; and implementing the second next action on the first web page to obtain a second web page.

17. The one or more non-transitory, computer-readable media of claim 16, wherein the second next action comprises clicking an element of the first web page or entering text into an element of the first web page.

18. The one or more non-transitory, computer-readable media of claim 16, wherein the instruction text is received from a support session between a customer and an agent.

19. The one or more non-transitory, computer-readable media of claim 16, wherein the first representation of the first web page omits one or more HTML elements of the first web page.

20. The one or more non-transitory, computer-readable media of claim 16, wherein creating the first language model prompt comprises replacing a placeholder in the task prompt template with a value for the placeholder.

* * * * *